(12) United States Patent
Haines

(10) Patent No.: US 7,084,742 B2
(45) Date of Patent: Aug. 1, 2006

(54) SYSTEM AND METHOD FOR TRANSMITTING CONTROL INFORMATION OVER AN AC POWER NETWORK

(75) Inventor: Antony Vincent Haines, Christchurch (NZ)

(73) Assignee: ADS Enterprises NZ Ltd., Auckland (NZ)

( * ) Notice: Subject to any disclaimer, the term of this patent is extended or adjusted under 35 U.S.C. 154(b) by 0 days.

(21) Appl. No.: 10/974,637

(22) Filed: Oct. 27, 2004

(65) Prior Publication Data
US 2005/0111560 A1    May 26, 2005

(51) Int. Cl.
G05B 11/01 (2006.01)
H04L 27/00 (2006.01)

(52) U.S. Cl. ............. 340/310.12; 340/310.11; 375/259

(58) Field of Classification Search ......... 340/310.02; 375/139; 700/289
See application file for complete search history.

(56) References Cited

U.S. PATENT DOCUMENTS

| | | | | |
|---|---|---|---|---|
| 5,559,377 A | * | 9/1996 | Abraham | 307/104 |
| 5,903,594 A | * | 5/1999 | Saulnier et al. | 375/130 |
| 2002/0196128 A1 | * | 12/2002 | Gaus et al. | 340/310.01 |

* cited by examiner

Primary Examiner—Donnie L. Crosland

(57) ABSTRACT

Disclosed is a transmission system for transmitting digital information via a power supply network. In one embodiment, there is a transmission device which comprises a generator for generating a simulated digital wave-form carrying the digital information to be transmitted, and a high-voltage injector to inject the generated simulated digital wave-form carrying the digital information into the power supply network. A receiving device is also disclosed, which comprises an analog detector for detecting predetermined harmonic frequencies of a signal frequency, and a logic device to output a logic signal corresponding to the output of the analog detector as said digital information.

13 Claims, 11 Drawing Sheets

SYSTEM AND METHOD FOR TRANSMITTING CONTROL INFORMATION OVER AN AC POWER NETWORK

CROSS-REFERENCE

This application claims benefit of the filing date of European Patent Application Number 03026995.5, entitled, "System for Sending Date and Time and Control Messages to Clocks or Electrical Appliances Connected to an Electricity Reticulation Network" filed on Nov. 26, 2003.

TECHNICAL FIELD

The present invention relates to a system for transmitting digital information via a power supply network and using this information to control and/or enhance electronic devices.

BACKGROUND INFORMATION

Electricity at 60 Hz is normally distributed by a 3 phase 11 KV or 33 KV network distribution network. Its final step is to pass through neighborhood transformers which drop the voltage down to typically either a nominal 110VΦ/N for use by the networks retail customers.

The AC Power distribution Network looking downstream behaves as a very low pass filter, i.e. it attenuates frequencies sharply much above 100 Hz and by 1400 Hz transmission at regulated voltages is all but impossible. This is primarily due to cumulative noise generated by all devices attached to the power network. Such electrical noise eventually swamps even the most sophisticated modulation schemes.

The design of power transformers with low downstream impedance (towards the load) and very high upstream impedance (towards source) is deliberate. In part to protect the medium and high voltage feeder networks from the very high composite noise that would otherwise be generated by all devices connected to the power reticulation network. As a result of this design characteristic, upstream message propagation is blocked. This makes the power distribution system difficult and expensive to use for bi-directional data networks such as Internet traffic.

AC Power is a commodity that can not be stored. In periods of high or low demand utility or power companies may use 'Ripple Control', a very low speed on/off semaphore messaging system, to signal control equipment located in the consumers meter-box. The utility uses this signal to control blocks of network load of the same type, i.e. to turn hot water heaters on and off during times of peak load.

The electricity supply company promises to provide electricity with a very high availability on 'time of day' and/or use based tariffs. Nominally amplitude variations of the AC signal are regulated to not exceed a fluctuation of +/−5% which may otherwise occur due to surge, disruption, sudden load spikes caused elsewhere in the network, or even the cumulative effect of AC motors in a large number of residential commercial and industrial appliances. Realizing the benefits to customers and themselves of providing off peak power, or ways of controlling load during times of peak demand, power companies use 'Ripple Control', currently operating under these regulatory constraints, to transmit their own control signals throughout the network. These signals normally are detected by sealed control relays in the customers meter box which result in turning off or on all ripple control relay circuits set to the transmitted code. Domestic and industrial uses include storage heating, hot water, and high loads such as Kilns and factory production lines that can easily be stopped and restarted if needed in emergencies. By offering a reduced tariff the electricity companies get to manage this load in times of emergency but can not easily isolate a single device or small customer.

Ripple Injection systems normally use short fixed duration bursts of a single frequency within a fixed 8 or 16 slot time window. The resulting 'code' is a binary number matched to a receiver controlling an on/off relay at all customer premises based normally on the type of controlled load.

Modern ripple injection systems based on a time division single frequency model.

Ripple injection messages are usually measured in signals per hour where each signal can typically take 6 to 12 seconds to transmit in effect 8 bits of data. This results in ripple control being useless as a general messaging system with its total throughput measured in bits per hour. The receivers are also bulky and expensive and not suited to the kind of automation that a customer would use.

Enermet is a major European manufacturer of ripple injection 'plant' that is used around the world. Current technology uses solid-state electronics devices matched to the distribution feeder voltage nominally at 11 KV, to add the ripple control signals. These devices can not operate continuously for prolonged periods due to overheating and have short life expectancies for a very expensive and functionally crucial device to the power company if they are used frequently.

The on/off duty cycle of existing ripple control systems is a significant design issue. Historically overheating and power consumption are the major factors limiting the equipment's use. Impedance mismatches and even the small voltage fluctuations at the high operating voltages of solid state ripple control result in the matching equipment overheating (low voltage) or needing to be rated at a high power to provide power in parallel with the main power distribution network (high voltage).

Existing ripple control equipment currently doesn't run much above a 1% utilisation due to over heating caused by the small voltages fluctuating between drawing and providing energy to a matched load typically in the 30 megawatt plus range.

Looking upstream the 'reluctance' of the network is extremely high. Designed that way to block the noise generated by all the devices attached to the network, from the feeder network itself. Consequently any upstream digital signal is blocked at each neighborhood transformer. IP over AC power-lines such as that used by "Adaptive Networks Inc." therefore must include termination and retransmission at each neighborhood transformer. This requires expensive or elaborate devices or the co-location of data networking equipment to propagate the signal back to the central transmission point via other means such as radio, telephone line, fiber optic or such data line.

The problems continue downstream in distributing an IP type Internet network using the Power Network.

1. Cost. A high premium for a high bandwidth duplex signal with huge cost infrastructure for the upstream pathway. For example 14.4 kbps to 128 Kbps signal for IP type connectivity and demodulation of the signal at point of use. In England and the US recent trials used a $1000 device attached and sealed within the user/customer meter box as well as requiring upstream equipment and a telephone line at each neighborhood transformer.

2. Local distribution network. The meter box then requires connection to a local area network within the home typically using the telephone wires or other new wiring or wireless equipment to distribute the signal. Older buildings don't tend to have existing phone wiring in every room, and using an RF type link is expensive and restrictive based on building construction materials.

Adaptive Networks Inc. uses a spread spectrum approach to include modulated bandwidth that excludes interference. This other than complexity and cost also suffers limited distribution distance due to attenuation and interference.

Therefore, it is the object underlying the invention to provide an improved and/or secure low speed system for transmitting digital information via a power supply network and using this information to control and/or enhance electronic devices.

This object is solved by a transmission device for transmitting digital information via a power supply network, a receiving device for receiving digital information via a power supply network, a method for transmitting digital information via a power supply network, and a method for receiving digital information via a power supply network.

Therefore, a transmission device for transmitting digital information via a power supply network according to the present invention comprises a generator for generating a simulated digital wave-form carrying the digital information to be transmitted, wherein the simulated digital wave-form is built of predetermined harmonic frequencies of a signal frequency, and a high-voltage injector to inject the generated simulated digital wave-form carrying the digital information into the power supply network.

Correspondingly, a receiving device for receiving digital information via a power supply network, according to the present invention comprises an analog detector for detecting predetermined harmonic frequencies of a signal frequency, and a logic device to output a logic signal corresponding to the output of the analog detector as said digital information.

Further correspondingly, a method for transmitting digital information via a power supply network according to the present invention comprises the steps of:

generating a simulated digital wave-form carrying the digital information to be transmitted, wherein the simulated digital wave-form is built of predetermined harmonic frequencies of a signal frequency, and injecting the generated simulated digital wave-form carrying the digital information into the power supply network.

Still further correspondingly, a method for receiving digital information via a power supply network according to the present invention comprises the steps of:

detecting predetermined harmonic frequencies of the signal frequency, and outputting a logic signal corresponding to the detection result as said digital information.

Therewith, the present invention operates similarly to a ripple control system, at or below the same tolerances that existing ripple equipment operates. This is deliberate as incorporating these factors into the design reduces the certification requirements for deploying transmitters according to the present invention.

However, using the electrical characteristics of the AC network to design a matched transmitter and/or receiver according to the present invention, and knowing that any strange wave-form or combination of frequencies, or any type of modulation in our transmitter could be matched, the present invention took advantage of being able to produce a unique and specialized approach to signaling in the Power network, namely not to use expensive dynamic frequency splitting to increase the bit rate of a digital signal, but to seek robustness in using frequencies and minimal harmonics thereof emulating a digital signal not attenuated by the network and those not being interfered with by other electrical devices. Using only predetermined harmonics of the signaling frequency simplifies the detection circuitry and also minimizes interference created from the transmitter although generally only lower data throughput rates are achieved in comparison to the dynamic frequency splitting. The design and resulting circuit designs according to the present invention are extremely robust to give longevity and enable them to be embedded within the AC powered appliance's power supply.

The signal transmitted using the present invention will be detectable within the power supply of any electrical appliance or device connected to the AC power source. The present invention does not affect ripple control receivers or equipment attached to the power system.

The present invention does not address the bi-directional or IP markets, but transmits a proprietary modulation and data format. It is unidirectional and broadcast in nature unlike that used within power system based IP based (Internet) networks that have been tried to date. As set-out, the present invention is not simply the downstream piece of an IP based system. The present invention includes the physical integration to using only predetermined harmonics of the signaling frequency and through the possible and preferred use of cryptography techniques making an individual pathway between the transmitting device and a signal receiving device. The present invention thusly describes a much refined messaging system as it propagates freely anywhere there is an electrical power circuit, and without the need for other termination device or modifications to existing wiring.

Therewith, the signal transmitting device design according to the present invention maximizes the signals robustness at the receiving device interface according to the present invention based on being able to match exactly the electrical propagation characteristics of the transmission network to the programmable wave-form of the (high voltage) transmitter according to the present invention. The characteristics of the modulation and transmission according to the present invention include the following:

Low speed. Discrete Low frequencies, e.g. predetermined harmonics of a signaling frequency that itself is not a harmonic of the distribution frequency of the AC power network itself, e.g. 167 or 267 Hz.

Not needing to use Spread Spectrum or other sophisticated techniques, resulting in low cost and resistance to electrical noise.

No pulse shift keying as some 'Ripple Control Systems' do, and then only at a circuit level. The system according to the present invention improves data rate greatly by over 400% but still at a low speed of e.g. 400-2000 bits per second.

In the transmission device according to the present invention, said high-voltage injector preferably comprises drive stage transistors to inject the generated simulated digital wave-form carrying the digital information into the power supply network, and a chopping unit that rapidly turns the drive stage transistors on and off in conformance with the shape of the low frequency wave-form, in particular at a frequency greater than 6 kHz but according to the fundamental signaling frequency to avoid a phenomenon common to digital signaling called 'aliasing'.

Correspondingly, the method for transmitting digital information via a power supply network according to the present invention preferably comprises the step of rapidly turning drive stage transistors on and off in conformance with the shape of the low frequency wave-form, in particular at a frequency greater than 6 kHz.

Where most modern solid state systems can not operate continuously due to heating and sizing constraints, this preferred embodiment according to the present invention offers a new system of rapidly switching the drive stage transistors, in the following referred to as 'chopping'. Chopping involves rapidly turning the drive stage transistors on and off in conformance with the shape of the low frequency wave-form. Turning the transistors on and off at greater than 6 kHz, and being able to vary the message duty cycle based on the specific network condition, a nearly '100% on' or signaling condition is approached. This also reduces the power rating of the injection device or any matching transformer connected to the power distribution network. This enables the system according to the present invention to 'broadcast' its digital signal continuously, at least as far as the receiver perceives it, and much more efficiently than used in other power transmission signaling systems. This preferred embodiment according to the present invention enables cooling the active system if required by altering the on/off or chopping duty cycle, or by reducing the message transmission rate down to a level to maintain just the date/time updates.

The chopping also reduces heating and the power consumption by around 50% transmitting actually only ½ the time and dramatically increasing the life expectancy of the equipment. In an electricity supply network the high frequency switching or chopping component is rapidly attenuated in the network within 1500 yards and is not seen by the receivers according to the present invention at all.

This preferred signal transmitting device design and preferred method for transmitting digital information via a power supply network improves a high voltage transmitter's power efficiency by more than 50%, achieving continuous transmission where other signaling transmission systems such as Ripple Control typically operate inefficiently at less than 1% utilization with a much lower effective data rate.

The transmission device according to the present invention further preferably comprises
  a feedback control that detects specific conditions of the power supply network to vary the chopping on/off cycle of the drive stage transistors accordingly and/or to shut down and turn on the drive stage transistors accordingly.

Correspondingly, the method for transmitting digital information via a power supply network according to the present invention further preferably comprises the steps of detecting specific conditions of the power supply network, and varying the chopping on/off cycle of the drive stage transistors accordingly and/or shutting down and turning on the drive stage transistors accordingly.

According to the present invention, i.e. for the transmission device, the receiving device, the method for transmitting digital information and the method for receiving digital information, said predetermined harmonic frequencies of the signal frequency preferably include the first and third harmonic frequencies of the signal frequency.

In this case, a logic '1' might be defined as the primary signaling frequency and the negative cycle of the third harmonic at a predetermined first signal level, preferably −8 dB, and a logic '0' might be defined as the negative cycle of the third harmonic at a predetermined second signal level, preferably −6 dB, preferably respectively preceded by a synchronization preamble at a higher frequency, preferably of some higher harmonic of the signal frequency.

According to the present invention, i.e. for the transmission device, the receiving device, the method for transmitting digital information and the method for receiving digital information, said digital information preferably is
  date and/or time and/or time-zone information, and/or
  control information, which control information is preferably encrypted and comprises an addressing functionality so that at least one particular receiving device, in particular one and only one particular receiving device, connected to said power supply network can access said control information, in particular control instructions and digital information attached thereto.

In this case said digital information is preferably used
  in a device or chip integrally adapted, by means of the circuit logic or design of said device or chip to process said digital information to control a remote activation or operation of some manufacturer feature or to enhance the device or chip by integration of a trusted control feature and/or an accurately synchronized date and time, and/or
  for implementing secure remote instruction or operation of load management and switching devices used in high voltage power distribution systems.

Further, according to the present invention said digital information might be used to transmit a synchronized date and time to update automatically and continuously a date and time to electrically powered devices using the power supply network for transmission.

Therewith, the control technology possible according to the present invention gives a power company the ability to easily securely and cheaply address a single customer's circuit, or a single appliance.

Preferred methods that will refer to uses of the system according to the present invention are:
  1. Integration of Date and time into the display controller of a clock or control panel for an electrical appliance.
  2. Integration of the time pulse into a PC Motherboard Real Time Controller Chip. This replaces the need for a battery on the motherboard and will allow time to be updated while the PC is connected. Therewith, cost of PC motherboard is reduced by removing need for battery backup by modification to the real time clock device such as represented by an Intel 8253 or SPK Electronics Taiwan RTC7301 or similar. Alternately, a device containing such RTC function such as an SMC Enhanced PCI South Bridge with real time clock can be directly connected to the receiver according to the present invention or have such a receiver integrated.
  3. Secure remote control and load management of electrical switching equipment and load by power distribution companies. A mechanical device driven by hydraulic piston might activate an oil, air, vacuum, magnetic, sulfur hexafluoride, or other high voltage circuit breaker after the power has failed, to remove the load. Safety features to avoid mistakes might be included and the device might have a lock out so it is only activated on power loss or by specially regulated override control. A hydraulic activator activated after power failure might open its contacts and upon a programmable delay after power reinstatement will close the circuit breaker. This gives the companies a much more refined control of inductive load spikes upon trying to reinstate power. A particular control code might be reserved for electricity companies and the data field can include group addressing of devices.

4. Controlling electrical devices in the home by integrating securely addressed control information directly into appliance controller logic, e.g. in an autonomous house refrigerator, washing machine, DVD, or heater/air-conditioning system.

The receiving device according to the present invention preferably comprises an optical interface arranged in an output path of the logic device. Such an optical isolation is used to protect attached digital devices from interference from or to the power supply.

The receiving device according to the present invention alternatively or additionally preferably comprises an information retrieval unit to retrieve control information directed to said particular receiving device.

Correspondingly, the method for receiving digital information via a power supply network according to the present invention preferably comprises the step of retrieving control information directed to said particular receiving device.

In the receiving device according to the present invention said information retrieval unit preferably comprises a decryption unit to verify whether or not said control information is addressed to said particular receiving device and to decrypt said control information with a predetermined key.

Correspondingly, the method for receiving digital information via a power supply network according to the present invention further preferably comprises the step of verifying whether or not said control information is addressed to a particular receiving device and to decrypt said control information with a predetermined key.

Therewith, the present invention preferably enables a method for transmitting control information using no explicit address.

The receiving device according to the present invention is preferably integrated in a personal computer or other electronic device displaying or using date and time or private control information or instructions.

Generally, it is preferred that the receiving device according to the present invention
- outputs either a verified control signal or continuous date and time synchronized to an atomic source,
- can be integrated into the controllers and integrated circuits providing an immediate and accurate date and time reference while the AC power is turned on,
- generates a serial data stream output in a special format to minimise chip manufacturers development costs and directly connected to the manufacturers IC (the receiving device switches a digital signal of ones and zeroes built from the same DC voltage sources used by the appliance's electronic circuitry itself),
- can be integrated at least partly into other devices such as Intel's or other manufacturers real time clock controller chip to reduce the cost of the PC motherboard or other device by removing the battery and associated units.

SUMMARY

The previously mentioned needs are fulfilled with various embodiments of the present invention. For instance, in one embodiment, there is disclosed a transmission device for transmitting digital information via a power supply network, having a generator for generating a simulated digital wave-form carrying the digital information to be transmitted, wherein the simulated digital wave-form is built of predetermined harmonic frequencies of a signal frequency, and a high-voltage injector to inject the generated simulated digital wave-form carrying the digital information into the power supply network.

These and other features, and advantages, will be more clearly understood from the following detailed description taken in conjunction with the accompanying drawings.

It is important to note the drawings are not intended to represent the only form of the invention.

DETAILED DESCRIPTION

Figure 1:
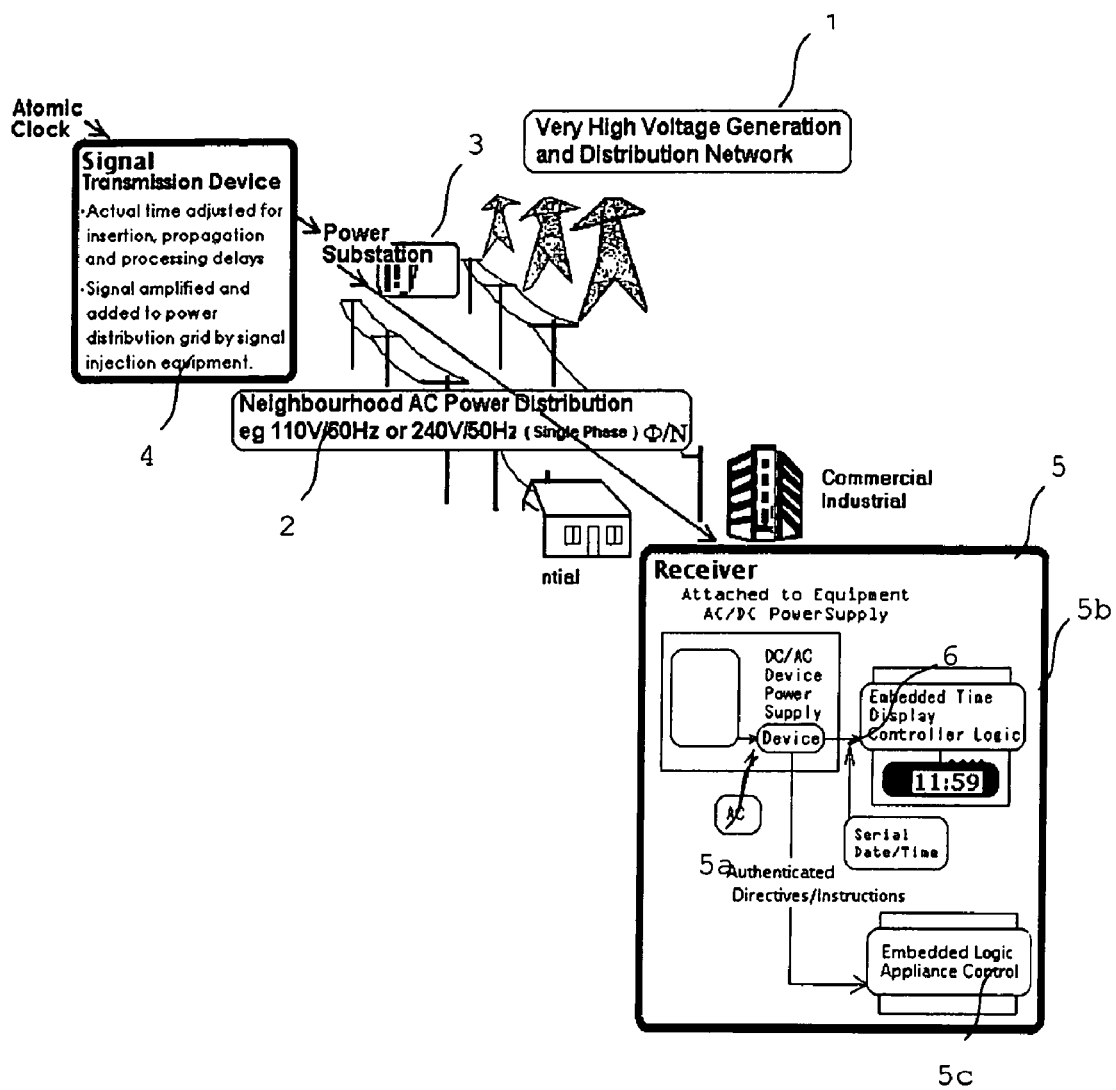
FIG. 1 shows an exemplary preferred embodiment of the present invention, referred to as 'The OnTime™ Distribution System'.

For the purposes of promoting an understanding of the principles of the present inventions, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

OnTime™ describes a 'Method' for continuously transmitting a Date and Time synchronisation signal to clocks and electronic appliances using or displaying time.

FIG. 1 shows an arbitrary AC Power reticulation network, comprising a very high voltage generation and distribution network 1 and a neighborhood AC power distribution 2, which are connected via a power substation 3. OnTime™ will operate when added to any existing power network, anywhere in the world, with respect to the licensing, safety, voltages and frequencies used in the distribution of electricity. FIG. 1 also shows specifically how the Date/Time function is effected, namely by feeding an atomic clock signal via a signal transmission device 4 and the power substation 3 into the power network. The Signal transmission device 4 adjusts the actual time for insertion, propagation and processing delays, amplifies this signal and adds the amplified signal to the power distribution grid by signal injection equipment. Date/Time being the primary function of this preferred embodiment. A receiver 5 that is attached to an equipment AC/DC power supply 5a can supply serial date/time information via the actual receiving device 6 to an embedded time display controller logic 5b and/or authenticated directives/instructions to an embedded logic appliance control 5c.

According to OnTime™ a low speed data stream comprising logic '0's and logic '1's is broadcast continuously over the AC Power distribution network. This includes a date and time signal e.g. synchronized off an atomic clock so that sub second accuracy is achieved with signals synchronized on the last transmitted bit. When the system is not transmitting Date/Time signals it can transmit authenticated private control messages for electrical appliances that are now individually addressable using OnTime™.

Figure 2:
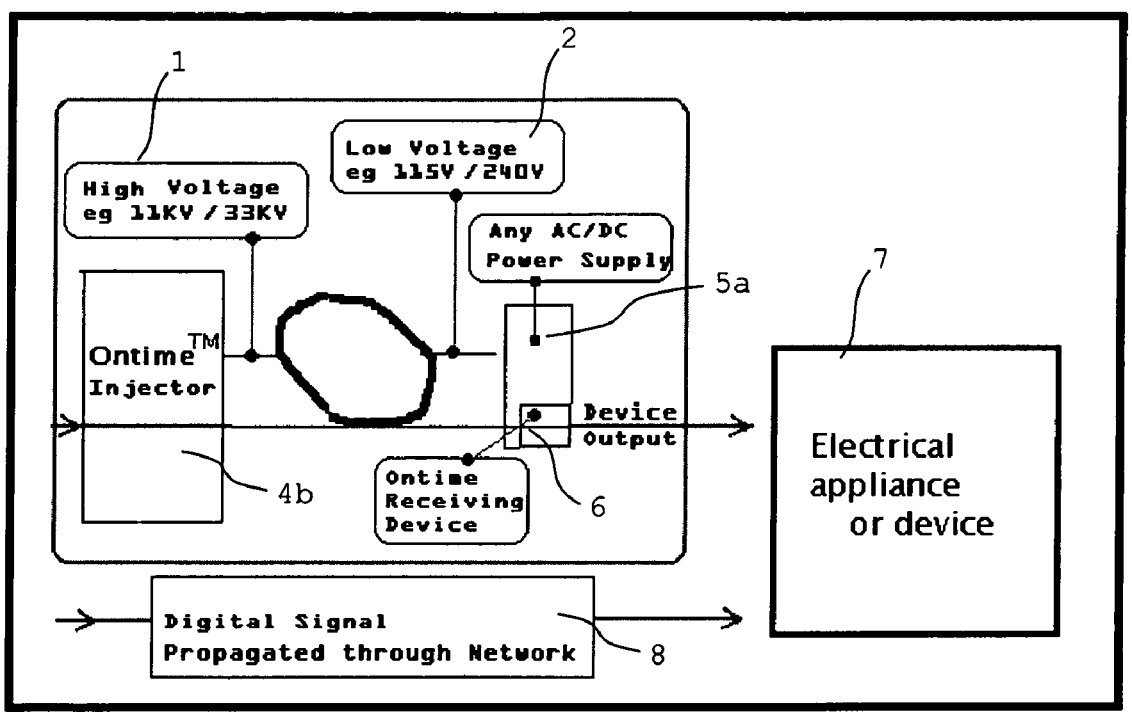
FIG. 2 shows 'The Embedded OnTime™ Receiver' according to the exemplary preferred embodiment shown in FIG. 1.

A receiving device that is embedded into the OnTime™ system as also shown in FIG. 2, in which the same reference numbers as shown in FIG. 1 denote the same components, and that is integrated into the power supply of electrical devices demodulates and passes a digital sequence to the control or display electronics driving clocks, electronic devices and electrical appliances. The OnTime™ system is able to send and demodulate a continuous digital-data stream 8 via an OnTime™ injector 4b that is part of the transmission device 4 anywhere within the Electricity Distribution Network. It attaches anywhere AC cabling is run and its robustness and low cost make it easily included into every power supply 5a or connect to an appliance 7.

Figure 3:
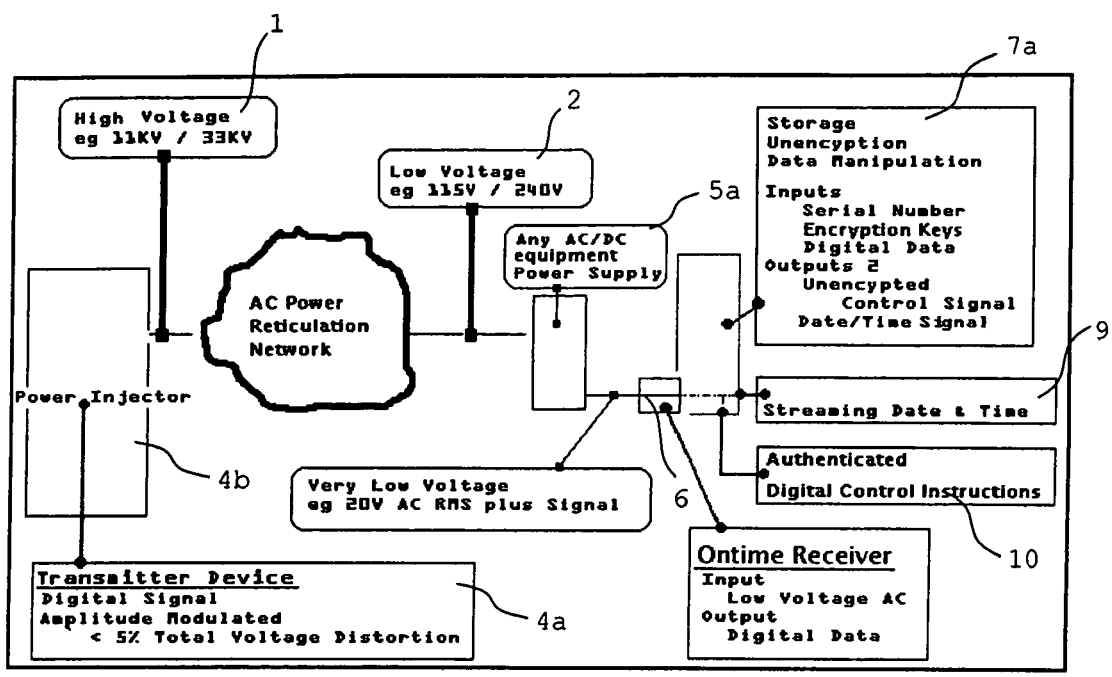
FIG. 3 shows 'OnTime™ Components' according to the exemplary preferred embodiment shown in FIG. 1.

FIG. 3, in which the same reference numbers as shown in FIGS. 1 and 2 denote the same components, again shows the OnTime™ components. A high voltage, transmission device 4, that includes a power injector 4b and a transmitter device 4a to generate the digital signal that is amplitude modulated <5% total voltage distortion, uses a robust modulation scheme to broadcast a date and time synchronization signal throughout the power distribution network. A simple OnTime™ receiving device 6, located within any electrical appliance power supply demodulates a low voltage (nominally 20V RMS +/-) synchronized date/time signal 9 or an owner initiated and authenticated control message 10 and passes them to an attached clock or appliance. The receiving device 7a has a storage, a decryption unit and a data manipulation unit. It receives a serial number, encryption keys and digital data and outputs an unencrypted control signal and/or the date/time signal.

OnTime™ technology provides value added in the operation and use of any AC powered appliance and equipment manufacturers can use it for one or both of the following applications:

1. A frequent and continuous date and time pulse synchronized to an atomic clock and the receiver attached in the appliance power supply, or
2. a secure private control signal transmitted to the appliance, where the message, although broadcast by the power company is private, implicitly addressed and then only of use to a single device on the network, as will be set-out below.

For a time display device when the power is on the clock will show accurate time automatically without human intervention. This includes immediately after any OnTime™ capable device is first plugged in, or when power returns after an outage.

Date and Time is broadcast on regular sub-second intervals to update clocks. Control signals are transmitted by the power company on customer demand following strict manufacturer, legal i.e. monitoring, and definition of owner or normal user of such equipment or appliance and guidelines for registration and use of the system.

The 'Type I' 'Receiver Device' demodulates a serial date and time data stream and relays it via a custom serial output data line to a directly connected clock, appliance, or other electronic or control circuitry. This is the case when an OnTime™ equipped ON/OFF Power Switch is used to turn an electrical appliance on or off.

If the OnTime™ appliance uses a clock for display, the connection will be directly to the microprocessor, or even the 7 Segment display controller for the time piece. The reference signal can be accessed immediately once the device has its AC power either turned on, or restored following a power outage (occurs within 0.1 to 0.3 s).

The refresh timing will depend on the device or appliance incorporating the OnTime™ technology. The intervals are based on the appliance's own functional design requirements.

The frequency and way in which the time is synchronized is more important for recording and event driven devices such as alarm clocks, DVD's, VCRs and computers, then it is for microwaves, ovens, washing-machines, refrigerators and other such appliances that may show current time, as only the default display when not in use or in a turned 'off', what is typically referred to as standby mode, but still with a closed circuit path to the AC power source.

The OnTime™ Type I device does not support encryption. However in the receiver's more advanced 'Type II' form it has intelligence with a 'unique serial number', a private encryption key and an elaborate message authentication process which is used as part of the addressing and validation scheme. The signal reception and demodulation function is part of the front end or 'Type I' device. An OnTime™ Type II device can also output a verified and unspecified control signal to a specific electrical appliance to do any legal action the manufacturer has designed and licensed. Such messages can be used for any function such as regulating the operation of an appliance remotely, or instigating a cause and effect action all within the secure operational constraints, reliability, and comfort offered by the customers Electricity Company or utility. In this Type II form using an 'implicit addressing feature' the device can also improve the time accuracy of the relayed date and time signal. The Type II receiver has numerous other control uses, too many to start to describe. Apart from initiating remote self test diagnostics and enabling or disabling equipment the owner of an OnTime™ equipped appliance can for example, turn a specific device on or off, or adjust an automated temperature setting or cycle. The technology could be used just as easily for a manufacturer to dump a log, do diagnostics and then call-back or email the results to a telephone number or address included in the control message.

Customers using the OnTime™ service might ask their utility to adjust the setting on their heating or cooling at home, or turn appliances or circuits on or off. They could even control a security lockout of all their electric gates, doors, portable phones and other devices related to the security of their home or office while they are away on holiday, or otherwise geographically isolated. An aspect of the security and safety of the OnTime™ system is that such actions are usually timely and ultimately verifiable by some phenomenon observed by a human being.

For example, sitting in their car stuck in traffic, or sitting at the airport waiting to leave on holiday with the family. They might ask questions easily assured by the OnTime™ system. For example; Did I put the AC/heating in holiday mode? Did I turn the alarm system on?. Did I remember to turn the heating up, down, on or off? Did I ask the refrigerator to send in the restocking order next week before we return? The possibilities are too numerous to detail.

Using OnTime™ these types of functions can be achieved by the customer making a single free call to their local power utility, then identifying themselves and asking for a holiday mode 80 degrees F. setting to be sent to their air conditioning unit, or in winter a 50 degree setting for their heater. Or a restocking request to go to any company e.g. such as XYZ for their refrigerator. Or a request, adhering strictly to copyright and other local legalities, for their DVD to record a cable Pay-Per-View program while they are away. Perhaps the customer also pre-registered specific messages and restricted only those to be ever transmitted. The default mode for a new serial number device entered into the OnTime™ system is that it can't do anything without a predefined message and human intervention. So they might just ask for their intelligent refrigerator to reschedule delivery for the day before they return home, earlier than expected from their vacation. Convenience and peace of mind are integral parts of the OnTime™ system.

Value added services provided by the 'Power Company' can therefore form an intrinsic part of the use of the OnTime™ system. Equipment manufacturers will integrate the OnTime™ Type II technology and register the digital injection sequences that can be sent to their device, additional values required and the action the appliance will take after receiving the authenticated control instruction.

The customer will have to provide the OnTime™ receiver serial number included in their appliance to use the remote control capability. Without registering the device with the Power Company having first retrieved the embedded serial number from any OnTime™ receiver, which is needed to send any control message, the OnTime™ functionality is inert except for the unencrypted Date and Time function. As a result such unregistered device could not be used, or as importantly accidentally used. The registration process may require physical access to the appliance or be provided by the appliance manufacturer at the customers request.

The OnTime™ project applies numerous electrical engineering theories and experience to extend the signaling beyond the typical on-off, single frequency low signaling rate of ripple control which is also unidirectional with unacknowledged messages.

The method defined in this embodiment of the present invention will result in radical commercialization and use of the broadcast of a date and time signal by any electrical equipment that would use an accurate time reference. In clocks, for example, if a manufacturer implements OnTime™ support in their equipment according to license requirements, then if the AC power is on the displayed time is correct to a sub-second accuracy.

The OnTime™ implementation includes features so that alarm clocks won't loose an alarm event even if a brief power interruption occurred prior to the set alarm, even if the clock had a malfunctioning or non-existent battery backup. Obviously the time will have reset when the power was reinstated. In this case if the whole house is OnTime™ ready the blissfully sleeping customer won't even know there was a power failure while they slept. No more waking up or coming home from work to a house full of blinking digital clocks on every appliance in the house. No more having all the clocks in the house display different times. No more worrying if you set am or pm on the DVD or VCR to record the Pay-Per-View program you forgot to order.

We assume the connection between the transmitter and receiver is very low bandwidth and is constrained to analog frequencies between 65 Hz and 1400 Hz to minimise propagation loss and interference from other electrical devices.

Also, the low pass characteristic of the AC power network results in significant attenuation above 1400 Hz. Experience shows unreliable transmission of single frequency ripple frequencies above 750 Hz for a 50 Hz system or 900 Hz for a 60 Hz power network due to interference from banks of fluorescent lighting and AC motors which have peaks in their harmonic interference at odd multiples of the exciting frequency at and above for example the 15th or $19^{th}$ harmonic.

For this preferred embodiment, a low voltage AC 'receiving device' is designed that is capable of demodulating the low speed digital signal broadcast from a high voltage transmitter located anywhere above it within the AC power reticulation (or distribution) network. The OnTime™ design takes into account interference from fluorescent lighting, AC motors and other sources, as well as the network's low pass filtering characteristic and currently operates at lower frequencies then those interference sources. The result is a closely integrated, robust, very low voltage modulation, transmission and reception design.

Choosing to restrict the voltage modulation to less than 5% and using similar frequency range to a long lived existing signaling system OnTime™ seeks to reduce the certification process for the equipment to be deployed.

In combination with a cheap, robust, low voltage AC 'Receiving Device' capable of demodulating a continuously broadcast digital signal anywhere for either a 110V/60 Hz or 230V/50 Hz electricity supply network there is provided a reliable, efficient, secure signaling network.

Rather then use spread spectrum techniques which result in expensive technology and which are prone to interference, a business model and technical solution for OnTime™ is developed that includes the broadcast of a date and time pulse to be picked up by receivers embedded in the power supplies of clocks, appliances and other AC powered equipment.

It is possible that the technology will be partially integrated into chip-sets and in most, if not all electrical appliance power supplies. This will be achieved via a separate winding or an auto-tap configuration at 20V RMS excluding the nominally 3% modulation signal (3% of the main distribution voltage, or nominally 7.2V RMS for a 230V or 3.3V for 110V RMS 60 Hz systems). The OnTime™, Binary Coded Decimal format transmitted is designed to minimize the signal insertion and message propagation delay for a low speed digital network. OnTime™ will nominally operate at data rates of between 300 bps and 2000 bps and transmit a signal that will also be directly compatible with most current 7 segment driver chip designs. These IC's and PCB designs can directly attach to the OnTime™ receiver output lead, by using a newly designated external pin on the individual appliance manufacturers IC or printed circuit board.

This integration is functionally shown in FIG. 3.

The 'receiving device' design is intended to minimize the development, tooling and production costs of integrating OnTime™ into existing integrated circuit designs. We use our own technique for coupling to internal chip logic levels and also use an isochronous bit rate to further minimize the detection costs within the varying manufacturers' chip-sets. As the OnTime™ receiver becomes physically tied to the internal logic of the receiving Integrated Circuit the internal design carefully considers and uses a fail-safe aspect of sharing dual access to a common shift register or memory location depending on the sophistication of the chip incorporating the OnTime™ line interface receiver.

For the purpose of showing a simple and working example, a signaling structure is shown that uses and can detect the $1^{st}$ and $3^{rd}$ harmonics of a signaling frequency at a particular threshold. This gives more noise tolerance and less sensitivity required at the detector then would be needed to detect a pure square wave where the third harmonic is −9.2 dB which for us would be about 20 mV on our 20V AC input signal waveform.

OnTime™ looked at many methods for transmitting and reconstructing a digital logic '1' and '0' from the presence, absence or synchronization of 2 or more either related or unrelated frequencies.

In our sample wave-form, for a Type I receiver, we use a pulse of higher frequency to synchronize the detector for an incoming data-bit. This allows us to use a variable bit length and increase data throughput, as is exemplary shown in FIG. 4, which shows the shape and duration of a logic 1 and logic 0 (Note the two different pulse lengths.). For a more advanced Type II receiving device the demodulation function is included within the device through an analog to digital converter with the signal detection and demodulation perhaps performed digitally.

A message synchronizing reset is 2 complete cycles of F3 at −9.45 dB for a 'Control' instruction or the absence of F3, the third harmonic, detected for a continuous period exceeding 28 mS at a 167 Hz primary signaling frequency.

Figure 7:
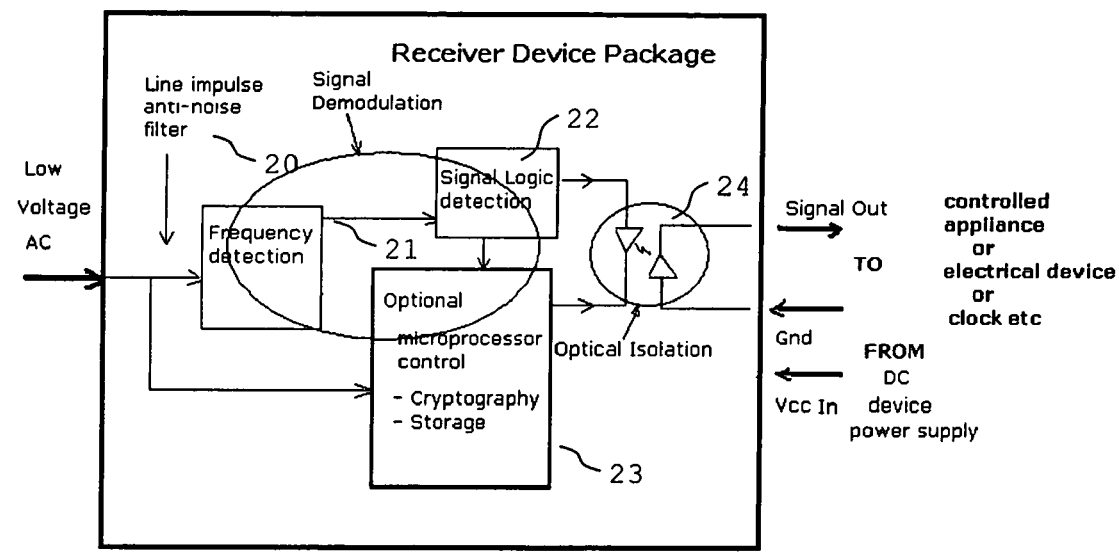
FIG. 7 shows 'Example of Receiver Logic Circuitry' according to the exemplary preferred embodiment shown in FIG. 1.

The PAL logic shown in FIG. 7 can be programmed to separate or maintain the $5^{th}$ harmonic preamble to a logic bit. The preamble is the positive cycle of F5, the fifth harmonic or similar frequency at a signal level of −6.7 dB with an optional signalling break condition, e.g. 0.3 mS.

In the shown sample wave-form, a pulse of higher frequency is used to synchronise the detector for an incoming data-bit. This allows to use a variable bit length and increase the data throughput rate, as well as to reduce the effects of noise in the scheme when using very low modulation voltages.

Generally, a square wave is comprised of an infinite number of odd multiples of the fundamental frequency. The magnitude of the components is according to Table 1.

TABLE 1

'Fourier Sequence Square Wave Coefficients'
Exponential Form Fourier Series coefficients.

| Harmonic | Signal (dBm) |
| --- | --- |
| First F1 | 0 |
| Third F3 | −9.54 |
| Fifth F5 | −13.98 |

Recognizing that the third harmonic is already 9.54 dB lower than the fundamental or signaling frequency at approximately 12% and the fifth harmonic is nearly 14 dB down or 3% of the primary or fundamental signaling frequency, a square-wave represented by only propagating partial wave-forms comprising the first and third harmonics is reproduced. Further, the third harmonic is set at a higher signal level than in Table 1, and the phase of the individual frequencies get aligned, since the Transmission device allows an almost arbitrary modulation wave form. This again increases the effective signaling rate in the restrictive operational environment. The result thereof is a more robust implementation of the signal detection in which the overall signal level of the OnTime™ signal can be dropped and the efficiency of the transmitter can be further improved.

While other spread-spectrum devices use expensive dynamic frequency splitting to increase the bit rate of a digital signal the receiver design according to the present invention seeks robustness in using frequencies not attenuated by the network and those not being interfered with by other electrical devices. By using selective frequencies the detection circuitry and interference is minimized, although it is at the cost of a low data throughput rate.

The resulting circuit designs are extremely robust to give longevity and enable them to be embedded within the AC powered appliance's power supply. By building the Type I receiving device front end filter from integrated analog components (to be fabricated perhaps on a ceramic wafer) it is further possible to optimize the safety of the device operating at 20V RMS. Typically operators of AC powered appliances are restricted access to the dangerous AC voltages of the electricity supply itself in consideration of safety. Often any AC transformers powering the device are separately enclosed or use a floating earth, i.e. are 'double insulated' or have some other physical isolation in their design making attempted access difficult and dangerous.

Coupling the output of the OnTime™ receiver to the typically low voltage DC silicon devices and minimizing the noise introduced, 2 DC voltages provided by the external device or printed circuit board are preferably used. An optical isolation is provided to restrict noise and to de-couple the IC silicon wafer from the AC power network. These 2 voltages represent both OnTime™'s and the IC's shared logic levels.

A '1' according to this shown and described preferred exemplary embodiment is preferably the primary signaling frequency and the negative cycle of the third harmonic at a level of −8 dB immediately following a synchronization preamble at a higher frequency.

A '0' according to this shown and described preferred exemplary embodiment is preferably the negative cycle of the third harmonic at a level of −6 dB immediately following a synchronization preamble at a higher frequency.

Each Message type preferably begins with a unique defining reset condition.

As Power distribution is hierarchical this requirement calls for the primary matched transmitter to operate at typical voltages of at least 11 KV Φ/Φ (Phase to phase).

OnTime™ uses a Binary Coded Decimal format to minimize the signal injection/propagation delay in a low speed digital network. The format is also more directly compatible with most current 7 Segment Driver Chip designs so the manufacturer can chose a point of minimal processing to use the reference date and time in their products.

The transmitter design includes a local connection to a control terminal. The control terminal pre-configures, corrects and synchronizes the signal for the gate control logic program firing the high power solid state transistors in the device. A hot standby is configured. Logging of all messages is performed for system and law enforcement purposes.

The control terminal will use a dual path either Internet or direct link to a reference source, e.g. an Atomic Clock. This is based on the ability of the data network configuration at the power company location to determine the actual propagation delay which must be accounted for in the broadcast time.

It is envisaged that the receiver technology will likely be partially integrated into the chip-sets of the appliances and electrical devices equipped with OnTime™, with the front end of the Type I 'Receiver' portion contained within the AC Step-down power transformer energizing the equipment. The Date/Time Type I system minimizes the costs for embedded chip manufacturers to use OnTime™ and migrate the function directly into their integrated circuits. In this case the receiver will pass all binary data through and not block non system control signals. By default, OnTime™ will be portable when incorporated into any electrical device and could form one of the features of an auto-voltage sensing power supply or a PC or any appliance power supply. The basic Type I device will automatically use local time as broadcast by the local electricity supplier with no configuration required.

The receiving device can easily be achieved in numerous ways using either analog or digital components. As a Type II device requires significant processing for the encryption and validation processes, it is likely that a Type II device will be comprised of a single chip microprocessor using an integrated A/D and software for OnTime™ signal demodulation, or a hybrid Type I with a digital interface to the Type II processing device 7a.

OnTime™ technology is capable of detecting between 0.3V and 1V on a 110V/60 Hz supply stepped down through auto-tap or separate winding to supply a low voltage AC signal (nominal 20Vrms). For both 230V and 110 V distribution systems regardless of the neighborhood reticulation transformers design (e.g. Multiple Earth Neutral, Star or Delta wound phases, operating at 50 Hz or 60 Hz) the effect of the design is in a floating earth or ground reference. This minimizes shock, improves safety, and reduces damage to self or attached device, giving a long life expectancy even in hostile industrial environments.

In its simplest form the Type I receiver strips off and does not pass digital data streams other than date and time to any attached equipment.

In its Type II form the receiving device has an embedded serial number and is able to forward unencrypted or 'clear' private messages to the attached equipment once they have been authenticated. A log is made of both all valid control messages received and the function and data fields as well for decrypted messages that had either an invalid MD5 or serial number. In the event that a valid message is received with either an invalid serial number or MD5 then the date and time checksum is deliberately set in a reserved 'error state'. It is set to Ox3F according to a predefined schedule that can be used for an audible or visual alarm. Encrypted control messages for a Type II receiving device allow unspecified functions to be directed to the attached electrical appliance or electronic equipment. This form also allows an arbitrary time-zone to be applied to any specific device. Particularly important in the event that a utility provides power to devices on either side of a time-zone separator, or in the case where some public areas clocks display current date and time in multiple cities simultaneously.

The advanced Type II feature also includes encrypted control functions to customize accuracy and behavior of the receiving device. These features include tuning the device to account for specific additional propagation and processing delay making the time device accurate to within 0.01 s. It would be yet another service of the power company to measure and set this adjustment, which is non trivial.

Target for the receiver devices, both Types I & II, is a realization as an enclosed small PCB (Printed Circuit Board) or ceramic wafer and analog RC filtering and/or an isolated ASIC devices so that the system is resistant to fluctuations in the voltage and frequency of the AC network and is also tamper resistant. The receiver should have a floating virtual earth/ground and will switch the voltages used in the attached electronic device to minimize noise and interference and to help protect the attached equipment in the event of voltage spikes on the AC network.

Within the OnTime™ equipped power supply, both casual fear and FCC and UL safety and non-interference legislation and liability provides significant penalty or disincentive for tampering with, or altering certified AC equipment or selling uncertified equipment. This further makes the job of security easier. Obviously, someone with intentions on a one-off attack could turn off the power to make the changes. However, if they can turn off the power, it is assumed that they have compromised some physical security.

Even 220V or 440V Φ/Φ neighborhood circuits typically run 400–800 amps per phase making it dangerous to try to tamper outside the OnTime™ user's building where the equipment is actually located. The physical detection, safety and likely disruption to neighborhood power giving a possible alert to the OnTime™ attacker's intent to an unrelated third party.

The broadcast control signal is unidirectional and rules about the timing and receipt of messages might be included which would have to be known to the intruder or their attack will be disregarded by the Type II receiving device. If an intruder attempted to filter out the control signals arbitrarily given they can not differentiate the intended recipient easily (i.e. in real time), they would have to know these rules.

Most electrical clocks use a seven segment display. Time is one of the few universally accepted international formats that are language independent. OnTime™ is designed for the manufacturers of embedded chip technologies used in electrical appliances and Personal Computers that display or would use an accurate time reference. Manufacturers of alarm clocks for example could use the external serial BCD time reference to synchronize their own internal time generating devices to an atomic clock source. No longer would clocks be flashing 03:43 at 8:17 am due to a power failure during the night. Clocks using LCD or LED displays driven by embedded chips can be easily modified to use the accurate OnTime™ reference time. It is proposed to our chip manufacturer technology partners, that they reserve an external pin for connection to the OnTime™ serial data stream.

Date and time are made available externally via a digital data line that connects directly to either an intelligent electronic device, or a 'chip'. Such device likely functions as the driver for a 7 Segment time and or date display present in most electrical appliances and electronic devices that typically have a clock as there idle display mode.

OnTime™ provides a low cost solution wherein the marketing advantages to any manufacturer of incorporating the technology far outlay the cost of making minor mask or design changes.

Whether the display controller which is normally a 7 segment driver is integrated into the clock or in a separate silicon device the OnTime™ function can be integrated directly to the point of use, i.e. the display drivers, logic, microprocessor or storage device.

The Type I Date/time feature is clear and unencrypted.

To break the integrity of, or 'crack' a Type II control system an intruder would need to:

1. Break well established principles of public trust,

2. Overcome numerous life threatening situations
3. Know the MD5 checksum algorithm
4. Know the checksum algorithm used
5. Know the serial number of the device addressed.
6. Know the appliance manufacturers' use of the optional data message and its format.

If an attacker wanted to affect a 'Trojan' or 'phantom' message they have to break both the public and the private keys needed to encrypt and decrypt the control message.
1. There are numerous other operational and proprietary safeguards not enumerated here.

The ability to 'crack' and illegally use an encrypted message requires knowledge of the methods, serial numbers of the target device and two encryption keys. These unpublished keys are used to un-encrypt the original message and to encrypt the new fake message. The complementary key is held securely outside of OnTime™ operational access as this key is never necessary to OnTime™ employees and embedded at time of manufacturer into the Type II device. It is the key used by the receiving device if they need information contained in the original message upon which to base their attack. The time and processing equipment necessary to crack such strong encryption makes certain timely applications such as turning devices on and off, locking down physical access or triggering call-back or other private response from a particular device practically impossible.

Further security is afforded by the location of the transmitting device and the geographical restriction on the number of devices that receive the digital messages.

The OnTime™ methods and procedures could be used by other networks and in other commercial applications. Implicitly it involves an understanding of the nature of using cryptography.

Equipment manufacturers can license and register each OnTime™ control string including the disclosure of the use or nature of the action that might be taken by their device upon receiving the message. Such messages could clearly be used to provide telephone numbers, web addresses, times, frequencies or other information for call-back via a separate communications pathway or network. Any other cause and effect action can be triggered by OnTime™ messages. The physical locations of the OnTime™ transmission equipment normally collocated with switching, metering and ripple control equipment are secure to prevent malicious damage within the Power system. This adds to the security of the OnTime™ system which makes it even more secure against even sophisticated attack.

Using a new multilevel format and cryptography to address a message gives a level of security in a public network. Only a Type II device with the correct Private Key can decode a valid message which was encrypted using a pubic key known only to OnTime™. Strong encryption means even if a signal is cracked the scope of the damage is limited and likely invalid due to the timeliness of the attack message. To send an invalid message an intruder must filter the old message and then inject a new message. To do this means they have cracked both the private and public keys, serial number and the Message digest and other formats not enumerated in this application.

Numerous value added services can be offered by the Power Company to the common 'user' or authorizing 'Owner' of any OnTime™ equipped appliance or device. Due to the envisaged low bandwidth this will be a high value added service.

The encryption design of OnTime™ is applicable to any transmission network that can be logically or physically isolated. Each control string must be registered with OnTime™ and so the logical step of having the authorities monitor the Control Terminal is easily performed.

All transmitted messages are logged together with reference date/time transmissions. For any data network the data can be filtered by a firewall, on a sub domain or other basis. This makes the technique for implied addressing a useful one.

This system is particularly suitable to application within any data network where segmentation is restricted whether by network configuration, i.e. routing, or the physical nature of the network transmitting the control instructions. Examples might be the earth footprint in a satellite or radio broadcast network or a physical segment caused by a shared carrier e.g. using Radio, cellular or Power Distribution network. In these cases each device is given some physical security and the complementary or public key, a serial number, message format, message digest algorithm and a hash code algorithm for the embedded serial number which is wholly sufficient to securely and indirectly address the message.

Examples of this method can be used to implement Virtual Private Networks without configuration. The encryption key, the message format and its associated checksums and a serial number form a sufficiently reliable private communication between the device sending and the device receiving said information. Very limited routing is possible as there is no way outside of the transmitting device to know who the intended recipient was.

OnTime™'s paradigm shift in the use of cryptographic techniques to implement virtual addressing by having all devices try to break a multilevel security code. OnTime™ asserts this method can be said to use an implicit address.

In the OnTime™ system the fact the receiving device is attached to the power supply makes it less accessible for tampering. Unlicensed product manufacturers face detection and prosecution by UL and FCC or other government agencies where such infringements can carry significant financial and jail terms for violations.

A certain degree of anonymity or privacy is afforded in a public data network by using the system defined herein.

To address a message to a particular device an address, or fixed routing information is usually necessary. OnTime™ asserts that 'if a sufficiently complex encryption process and associated keys and methods are used that even with a million devices trying to crack each control message that there is no chance of accidentally, or by repeated trial deliberately breaking such method.' It is further asserted therefore that this is a reasonable and sufficient way of addressing a specific physical device.

The control message format includes the primary control instruction field as the only 'clear field' in the message. This is done intentionally to allow network diagnostic, maintenance and logging functions. The clear field is part of the Message Digest checksum to prevent tampering. As the licensee appliance manufacturer specifies the control field and the format of the optional data transmitted and this information is transmitted in an encrypted field it is both secure and private.

If control instructions are broadcast sequentially and the network is restricted to a limited number of controlled devices then the following method is a reasonable means of assuring security.
1. Every Type II receiving device applies its own private key to try and decrypt every control message. The likelihood of a valid message being accidentally decoded by other than the intended or 'target' device is less than one chance in $10^{12}$. The likelihood of an accidental misdirected message validating is less than one in $10^{21}$. At 1800 control messages per minute, approximately 2.5 Million messages per day, it would take us 1 trillion years to see a message in error due to an unidentified bit error.

2. Upon receiving what might be a valid message based on format, the Type II device further checks a now clear Message Digest checksum to insure the message is unaltered.

3. Then and only then will the receiving device run a checksum over its own unique device serial number and compare it to the hashed and encrypted serial number broadcast with the message.

4. Once 'cleared' the Type II device will action or pass on the message to the attached device.

If appropriate, such as for micro time adjustments or time-zone corrections a type II device will store in non-volatile memory micro-time and/or time-zone adjustments once received and validated via special control message and thereafter automatically adjust all future date time strings accordingly.

Nominally OnTime™ will use high-voltage injection at for example 11 KV, 33 KV or 66 KV. A simulated digital wave-form comprising first and modified third harmonic is used at very low frequency to transmit a continuous date time pulse and control messages on demand in a manner that complies with local regulations regarding non-interference obligated of any power utility company. These regulations normally surround added noise and interference and include frequency and voltage interference from other sources. As noise generated by even quiet AC powered devices is cumulative the combined threshold is normally restricted to +/−5% in level and frequency if it is related to a harmonic of the power network itself.

Such distortions are easily rejected by most DC power supplies, have no detectable affect on small AC Motors and lighting. In the case of OnTime™ these deliberate distortions have little or no affect on any other control systems such as used in Ripple control. These systems are usually time division multiplexed at a single analog frequency. To minimize injection levels OnTime™ strives for a voltage modulation of less than 3% to be a good customer and also in self interest, protecting our own transmission devices. These lower levels also reduce power losses in the injection equipment.

For special customers a simple OnTime™ filter can be applied within a distribution region and an alternate low voltage e.g. 110 or 240V device purchased from OnTime™ to separately support date/time and control signals.

Examples of the use of such capability are:

1. Building/Electrical circuit specific control instructions and private use.
2. Allows transmitting device to operate locally at 230V or 110V.
3. Its use as a physical lock-down or an alternate time-zone. E.g. embassies or commercial entities wanting to effect the control of their local equipment without broadcasting secure data to the outside world. The filter blocks upstream data.

Figure 5:
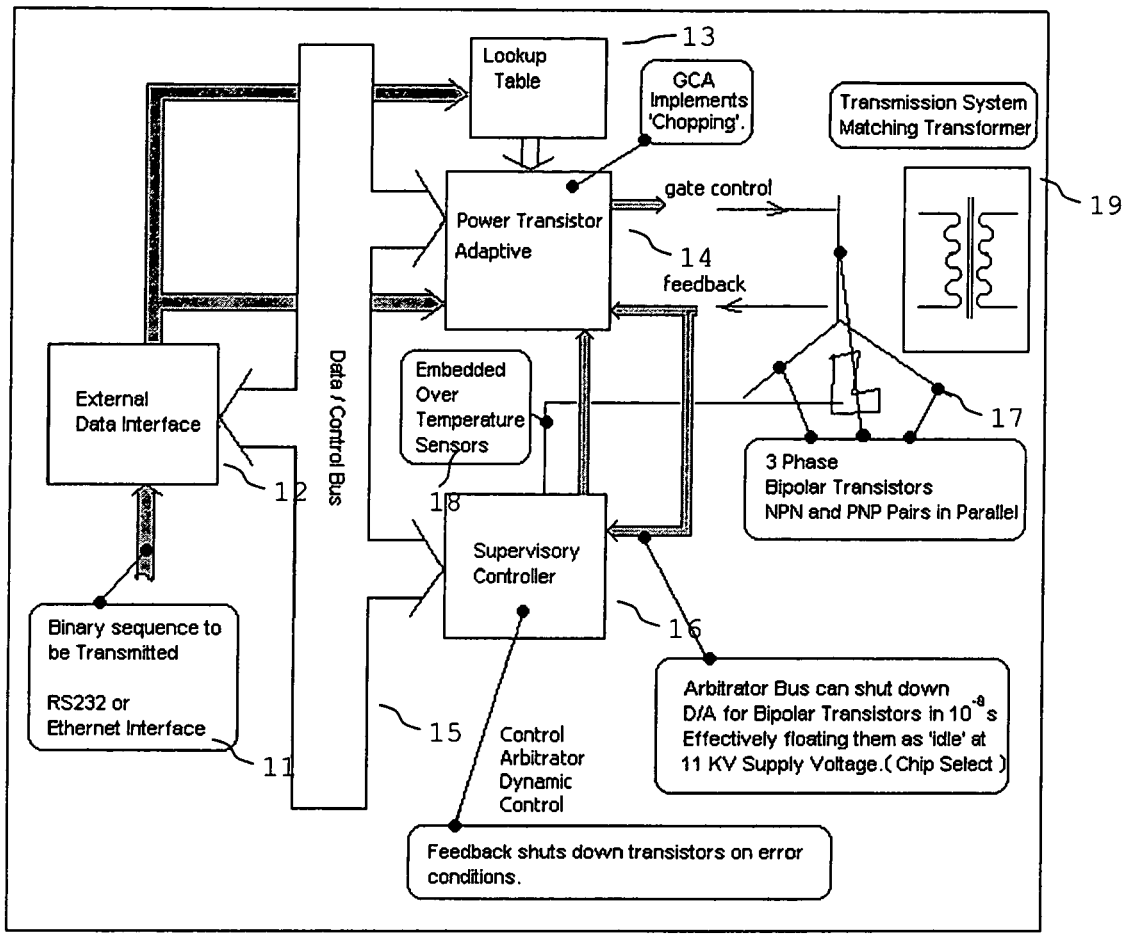
FIG. 5 shows 'OnTime™ Power Transmitter' according to the exemplary preferred embodiment shown in FIG. 1.

FIG. 5 shows an initial high voltage 'OnTime™ transmitting device' 4 in detail. As mentioned before, according to the described preferred embodiment of the present invention, a data stream is comprised of two frequencies instead of the single frequency on/off semaphore used in Ripple Control, which increased the bit-rate of transmissions and made OnTime™ possible.

The OnTime™ transmitting device 4 according to this preferred exemplary embodiment includes a local wired interface via for example an RS232 or Ethernet interface 11 via which a binary sequence to be transmitted is input to the transmitting device 4. The input signal is internally supplied to an external data interface 12 that feeds a lookup table 13 and a power transistor adaptive 14 for implementing chopping. The external data interface 12, the lookup table 13 and the power transistor adaptive 14 are controlled and exchange data via a data/control bus 15. Also connected to this data/control bus is a supervisory controller 16 that performs a dynamic control of the transmitting device 4, e.g. is responsible for an automatic shut-down of the transistors 17 on error conditions. The gates of the transistors 17 are controlled via the power transistor adaptive 14 and the transistors 17 give a feedback to the power transistor adaptive 14. Further, embedded over temperature sensors 18 supply a temperature signal corresponding to the temperature of the transistors to the supervisory controller 16. The transistors 17 are e.g. 3 phase bipolar transistors NPN and PNP in parallel and feed a transmission system matching transformer 19.

To add a signal to a high or low voltage system the voltages and impedance need to be as exactly matched as possible. Since the load represented by electrical devices consumes normally between 10 and 40 MW no currently existing signaling device is able to provide pro-rata anything like that load which is the best case if the impedance is exactly matched. If the voltage in the signaling device is less than the transmitting device then the signaling device becomes a power consumer and heating is significant at a distribution current of typically >8,000 amperes per phase. Consequently even the very best designed equipment has a power rating typically measured at or near 100 KVA.

FIG. 5 shows an active feedback loop to enable an instantaneous shutdown or for example dynamic alteration of the chopping on/off cycle based on temperature or other considerations. Remember chopping will better than halve the power dissipation of the output drivers.

Having modified a device that uses dual gate bipolar transistors as the output stage, the gate current logic might be programmed and therefore modified wave-forms might be transmitted. In all cases with power and heat dissipation restricting continuous use, a clever method based on the switching speed of the gated bipolar transistor is implemented to enable a near continuous 'on' state, as will be shown below.

The utilization of bandwidth given the low frequency signaling rate can be looked at by:

(1) Using Binary Coded Decimal for the date and time.
(2) Altering the duration of a mark and space i.e. logic 1 and logic 0. This requires looking at an unusual timing mechanism not based on ISA or other synchronous or asynchronous protocols. In looking at this and the electrical connection between the receiving device and the 7 segment display controller that the customer will modify, the size and cost of the mask changes for the 'silicon' chip need to be considered. Some form of implied synchronization for our isochronous signal should be available.
(3) An arbitrary adding of external pins is not wanted although in current thin film TFOL surface mount technology there are commonly extra pins so the shape of the resulting design makes this aspect of little consequence to chip manufacturers.

Figure 4:
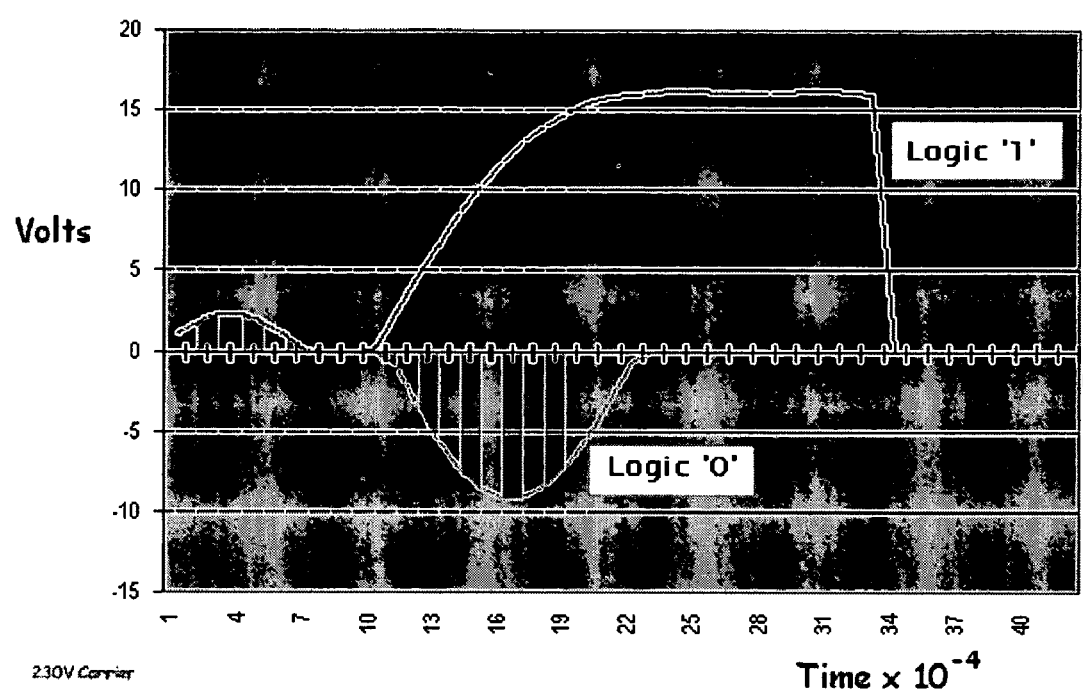
FIG. 4 shows 'Sample OnTime™, Pulse Wave-form' according to the exemplary preferred embodiment shown in FIG. 1.

FIG. 4 shows the shape and duration of a logic 1 and logic 0. Two different lengths are to be noted. A '1' is the primary signaling frequency and the negative phase adjusted cycle of the third harmonic at a level of −8 dB.

To reduce heating in the power stage of the high voltage transmitter the transmission cycle rate and the chopping duty cycle can be adjusted dynamically. The actual time is broadcast in 0.1 s increments and the goal is to broadcast time at least 3 times a second and the date at least 3 times every minute. The actual timing and frequency will be varied close to date changes and time events such as chronograph synchronization i.e. 'leap seconds' or shifts between standard times and daylight saving times. The transmitter control station can delay control signals at this time or during periods of 'over temperature'. The network utilization for date and time transmission is very low (less than 3%). Therefore, the control terminal can be programmed to arbitrarily restrict the number of injected control signals per minute based on any condition such as temperature or network fluctuations to maintain the primary function of the unit. Silence is effectively ignored by the receiving device and the power output stage of the transmitter if it is perfectly impedance matched to the network.

TABLE 2

'OnTime ™ Average Network Utilization'
OnTime ™$_{TM}$
Average Network Utilization

| Signaling Frequency | Type | Insertions | Aggregate Time s/min | Date/Time | Max Control msg./m |
|---|---|---|---|---|---|
| 143 Hz | Time @0.0935 s 1 × Reset +32 bit | 3/s | 1.62 s | 2.7% | 687 |
| | Date @0.0927 s 1.5 × Reset +31 bits | 3/min | 0.278 s | 0.46% | 687 |

Figure 6:
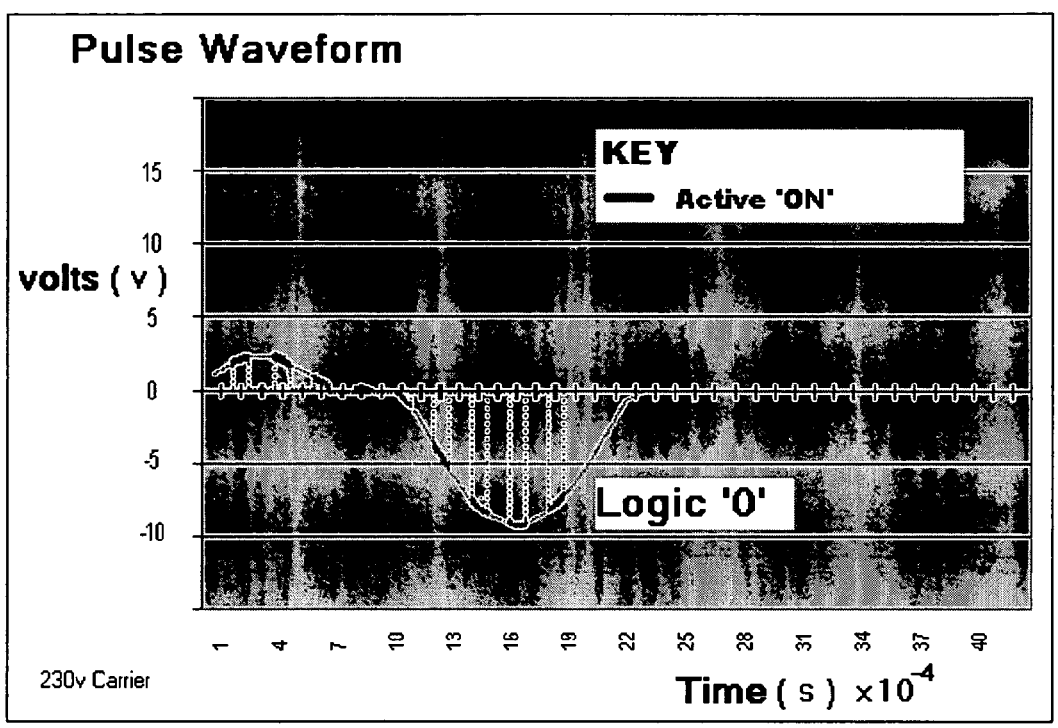
FIG. 6 shows 'Transmitter Signal, Chopped 0' according to the exemplary preferred embodiment shown in FIG. 1.

By applying a chopped signal as shown in FIG. 6, the duty cycle and the bit rate can be increased. FIG. 6 shows a 10 kHz chopping frequency with a '0' signaled over a duration of 2.3 ms.

The digital signal transmitted is either:
1. A very accurate. OnTime™ date/time/time-zone signal synchronised off an atomic clock, corrected for propagation delay and broadcast to clocks and other electronic and electrical devices needing the accurate time reference.
2. Available with an option to handle encrypted control signals using them to adjust for arbitrary time-zones and accurately applied adjustments to the propagation delay which results in accuracy's to 0.01 s.
3. Using the embedded cryptography and security of a type II device to transmit and validate a secure control signal to be passed to attached equipment.

The signals are unidirectional and unable to be acknowledged although the control signals are logged by the device. As a control signal it can be used to do anything the manufacturer programs a response to, from menial tasks like turning electrical equipment on and off, to causing an arbitrary action to initiate call-back, adjust some physical setting such as temperature or cause any other action. The control instruction data field provides a variable length field which could be used for a web address or telephone number or other such network identifier in the message sent to the device. This invokes a manufacturer designed action and may use an attached phone-line, wireless or other such connection to complete the transaction. OnTime™ will eventually and seamlessly integrate into the autonomous house which includes its own data network for inter-connectivity of lifestyle with functional household appliances and a high speed connection to the Internet or World Wide Web. The applications for OnTime™ control functionality are numerous. For example security lock-downs, waking up computers and other devices, as well as simple actions like controlling the setting on AC appliances such as heaters, air conditioners or by gross means regulating a switch-able power outlet to control the power to an unintelligent appliance plugged into any power outlet. For security the Power Utility won't know what the signal will result in although every transmitter signal is logged.

Privacy is considered paramount in a 'Public' system but the principle advantage of the OnTime™ system is derived from a unique optimization of the electrical characteristics of the Power Distribution network such as a narrow geographical coverage for the signal, and the nature of the OnTime™ receiving device's integration into the AC power supply of appliances in a way that is not usually customer accessible.

The OnTime™ receiving device's primary use is for demodulating a synchronized date and time signal. The OnTime™ Type II system uses an implicit addressing scheme for advanced control features which is based on secure cryptography. When combined with the intrinsic security of the Transmitting Device and the legal responsibility of the Utility Company, legality is assured and OnTime™ is easily restricted to legitimate use only.

OnTime™ needed a way of validating an intended recipient without explicitly addressing the device. Although relying on multilevel security and encryption is a 'privacy advantage' its primary use was to reduce the bandwidth requirement of our low bit-rate OnTime™ transmissions. Besides the need to save bandwidth we realized that the receiving device was affecting changes to the broadcast date and time passed on to the attached electronic device. To do that obviously we needed to send reliable, secure control signals to attached appliances or circuits. The offsets applied by our 'OnTime™ Standard' do not allow more than a 3.5 second adjustment although the Time Zone adjustment broadcast is from 0 to 24 Hrs. A manufacturer can chose how they implement OnTime™. This might be as simple as ignoring it in a licensed Type I device wherein the receiving device only effectively supports one local time-zone. Once this aspect is included in the design the tremendous commercial advantage of the system to Power Utilities and their consumers alike. For example service utilities could use OnTime™ embedded in Circuit breakers to turn on and off circuits for billing or load management applications. Wherein currently a ripple signal is not addressed to a specific customer appliance integrating OnTime™ will allow Utilities to do exactly that. As the power distribution network is effectively uni-directional, a robust modulation and encryption scheme is realized that is reliable and not subject to electrical interference from other devices attached to the AC network. Attempts even with sophisticated equipment and technologies to try to break a strong encryption key would be likely to take days or even months, and even then the system has two more levels of safeguard. The chances of a Type II receiver device accidentally breaking the code on a message that it was not intended to receive were practically 0. This is how the OnTime™ type II system was developed wherein although their maybe a large number of receiving devices it might also take seconds to handle every control message of a manufacturer indicated type.

The size of the control message times the maximum number of control messages of a compatible type, per minute sets the processing power required of a type II receiving device. A 32 bit device at 1MIP is sufficient, well within the range of a small, cheap, ASIC or PC on a chip device.

An incorrectly authenticated message is not possible, as the hierarchical authentication safeguards protect against it. This, despite the fact that hundreds of thousands of legitimate OnTime™ devices at 1MIP each are all trying to decrypt each message.

In its simplest form of a Type I receiving device there is an arbitrary 30 ms offset as there is no processing delay in the demodulation device. A Type I device has an analog detector and a PAL logic device to switch external voltages representing a logic 1 and logic 0. The receiving device is floating which effectively de-couples the power supply from the AC power supply. OnTime™'s optical isolation in the signal interface leads protects the attached logic e.g., the 7-Segment controller from external noise in the digital date/time signal bus or from the AC power supply network itself. The technology is licensable to be internal to the controlled device or appliance, which is obviously more secure.

FIG. 7 shows an example of a possible detector circuit, i.e. receiving device 6. The receiving device 6 comprises a line impulse anti-noise filter 20 that receives a low voltage AC including the OnTime™ signal and feeds a frequency detection circuit 21 as well as optionally an optional microprocessor control 23 for cryptography and/or storage. The frequency detection 21 supplies its detection signal to a signal logic detection 22 that feeds its output to an optical isolation 24, which outputs the date/time signal and/or the authenticated directives/instructions to a controlled appliance or electrical device or clock etc. the optical isolation 24 also receives a signal from the microprocessor control 23, if available. The receiver device 6 further receives a ground signal and a supply voltage from a DC device power supply.

There are numerous methods that can be used and the Type I and Type II devices if integrated would result in the signal being detected via a completely digital device.

The Type I PAL (Programmable Array Logic) circuit will reject control signals passing only Date and Time strings to external hardware based on detection of the reset preamble.

No Intelligence or serial number is ever included in a Type I device as no advanced features apply. As the licensing of the Transmitter is based on census numbers for the geographical database there is minimal loss of income for unlicensed receivers. Overall the lack of FCC Part 15 and Safety standards puts pirate Type I devices at significant risk for interception and serious fines. The Governments become the regulators for the receiving devices.

An intelligent Type II device is able to decrypt an encrypted message based on a stored unique private key and then validate the message format using an embedded and encrypted Message digest checksum to detect tampering. The device is able to adjust device specific propagation and processing delays in any future forwarded date or time string following receipt of an authentic control message to do so. A Type II device has two output lines. One is for date/time string and the other is for control messages and is optionally configurable to include both date and time in the event the external equipment is capable of supporting it.

A Type I device rejects control strings based on the simple logic related to the reset conditions before each message type. It has no intelligence or storage to remember or affect updates of any received strings.

A Type II device allows an individual device or appliance to be indirectly addressed using a cryptographic technique and then be instructed to adjust all future date and time strings for Time-zone or individual propagation and processing delays to an accuracy of 0.01 s. The device must store the adjustments as well as all logs, methods decryption keys etc. in a non-accessible form.

Each Type II device has 2 remotely programmable time offsets not present in the Type I receiver:
1. A different local time zone.
2. The time offset in 0.01 s increments of less than 3.5 s to account for location and device specific propagation and processing delays. The device shown in FIG. 2 has additional features available to authenticate a control signal based on its own unique serial number. It may also apply offsets for time-zone or transmission delay to all incoming time pulses before relaying the signal to time display and other devices not capable of making such adjustments.

A Type I device rejects control strings from the received data and outputs only an unadjusted date time string.

A Type II device allows an individual device to be indirectly addressed and transmitted a control message. The operational control messages include one for overriding the broadcast time-zone, and the other is used to modify all future date and time strings adjusting them for a device specific propagation and processing delay to an accuracy of 0.01 s. It must also apply its own processing delay and stores in non-volatile memory the control data or update fields as required.

The only other control message that is intercepted by a Type II device is to recover its log and other status information, keys and memory validation checksums (to detect tampering) via a locally attached hardware device. In this case the device uses its own private key to encrypt the message. This control message must be part of a sequence of private Control Instructions received to avoid hackers or unauthorized access. It is not envisaged that this is a simple or frequent event. It is reserved for legal purposes and requires physical access to the device.

External control messages are those passed to an attached electrical device or appliance. As part of OnTime™ they are authenticated based on the clear control ID field included in the message (this is the only unencrypted field) and does not have scope for all appliances based on a categorization OnTime™ gives each manufacturers function type.

Any message successfully decrypted that has an invalid format or MD5 checksum will update the Time Checksum with the reserved value 0x3F hex to indicate the intrusion at least once every minute for 30 minutes following the detected error. It is up to the Clock or other manufacturer to determine if they want to indicate the possibly 'hacked' control message visually or by some other means.

An arbitrary Data field length is added to a Control Message. The content and use of such data is entirely at the discretion of the equipment manufacturer. The message ID and any arbitrary data is agreed between manufacturer and OnTime™ and passed to the Power utilities controlling the Transmitting or Signal Injection gear and causing transmission of the actual control message.

Date and Time e.g. synchronized to an atomic clock is broadcast on a regular interval, Control signals can be interleaved and used to control electrical appliances. (This latter feature is entirely at the discretion of the equipment manufacturer under licensing agreement).

Each new transmitted sequence is either.
1. A time-of-day with checksum.

2. Date with checksum.
3. An encrypted digital directive or 'control message' to cause action by one piece of equipment only (No broadcast directives addressing more than one device exist). Security is afforded by the regulations surrounding casual interference with AC voltages used; normally 110V or 240 volts and the physical security surrounding the equipment located at the high voltage point where the signal is normally 'injected' into the power system.

The OnTime™ system transmits in a default local time-zone. It announces the offset it used to determine the local time shown in the date broadcast messages.

A simple 6-bit checksum is transmitted following the time pulse. If the display device is capable of calculating the checksum it can chose to ignore a time or date pulse in error. Accuracy for this small checksum is one error in 60000 time messages. However the time sequence is retransmitted at least three times every second anyway. Checksum 111111, i.e. 0x3F is reserved. A new time reference signal is recognized and is accepted if this checksum appears valid clearing the previous error condition.

The appliance or device using OnTime™ can chose to ignore a bad checksum or upon detecting same display the time regardless or with some alert condition. In such circumstances device may chose to indicate this condition via some visual, audible or other means.

A broadcast signal usually comprises either a date or more frequently local time based on the time-zone which is transmitted with the date string. All numeric fields in OnTime™ are in Binary Coded Decimal based on a variable bits per character fixed message format. This format is normally compatible with the energizing of a seven segment or other display controller. This reduces bandwidth requirements in a low bandwidth system and also reduces processing if any required to connect the serial data lead directly into a seven segment or other display controller energizing a clock. For intelligent devices such as the Real Time Clock chip in a Personal Computer the additional processing to convert it back to a binary, ASCII or other form is trivial.

The basic Type I receiving device forwards date and time to the attached clock or appliance and ignores or blocks any control signals. The frequency of date/time broadcasts varies according to the hour of the day and other occurrences such as individually broadcast control functions and any occurrence of disruption of service within the AC network or change of date or time.

An advanced Type II device is able to offset propagation and specific processing delay for the device and the time appliance by adding up to 3.5 Seconds to the received time in 0.01 s increments. As processing and propagation delays are fixed, this will allow an accuracy of 0.01 s in the attached device.

OnTime™ by default transmits time at least 3 times a second and date 3 times a minute.

The checksum includes use of a reserved code to signal conditions occurring in any function of the system. For example an encrypted data sequence transmitted that is correct in format but not according to the MD5 checksum then such condition will be flagged by applying the modified error condition checksum to at least one time packet each second until either a message with correct format is detected or a time period of 30 minutes has elapsed.

The synchronization of time string is with the end of the final bit of the time string (excluding the checksum). An arbitrary processing delay is included to account for the delay in displaying or processing the time string within the attached equipment to account for the prevalent situation where most receiving devices will be of Type I and not capable of processing based on the checksum error. If they can then blinking is probably sufficient.

Time is broadcast at least 3 times each second. The time-zone offset used to set 'local time' is transmitted along with the date string and therefore transmitted at least 3 times every minute. Time by default broadcasts as local time.

Frequency of transmission accounts for at least one hour either side of a chronological event and takes account of power distribution systems that may serve multiple time zones or public display locations that use clocks displaying local time in varied locations.

The time string broadcasts at an accuracy of 0.1 s but to within 0.017 s and includes a feature to add processing and local transmission and propagation delays to allow type two devices to add synchronization intervals in $\frac{1}{100}^{th}$ of a second increments.

When a time signal is broadcast to synchronize an event it is immediately preceded by a date and a time-zone reference for the Transmission point of insertion.

The OnTime™ transmitting device according to the described exemplary preferred embodiment of the invention might adjust the time string if necessary to account for:
1. The propagation delay from the actual atomic clock. Time is synchronized 17 milliseconds after receipt of the last bit of a valid time sequence to account for processing delay.
2. The system includes adjustment for its own processing time overhead if any.
3. An average network propagation delay (if applicable)

This results in no setup for use of a Type I device in a single time zone along with its transmitting device.

OnTime™ by default transmits a Date String at least 3 times a minute.

A date string occurs immediately preceding a time string as close as practicable to the hour or at such other occurrence or time as may be used locally.

A date string is transmitted at least 3 times every minute during the day and at an interval approaching once every second approaching the hour and for one hour prior to and a small interval following any time or date change. This allows the accurate use of the local time-zone offset that may be applied to the signal. Again dependent on which side of the time-zone the Transmitting device is.

A time-zone is included with the date, as it is broadcast less frequently and can be ignored by the receiving appliance due to the unique message reset preamble. This allows equipment licensed for OnTime™ Type II to adjust broadcasting date and time for a time-zone offset different from that broadcast by the power network as well as for refinement of the synchronization of the time string in 0.01 s increments.

By applying a high accuracy adjustment to account for individual processing or network propagation conditions, a theoretical accuracy of 0.01 s compared to the 0.1 s accuracy of the clear time signal is provided. Furthermore, other uses of such control signal are possible and are not enumerated here but are of economic or other value to the electricity provider or user.

Using this programmable adjustment it is more likely to achieve 0.1 s accuracy for a Type II device and 1 s accuracy for a Type I device.

Equipment can eventually adjust for the time-zone itself. It is expected it eventually will remove the need for a Type II device just for handling unexpected or strange time-zone requirements. Additional processing can obviously be done by intelligent or other equipment attached to the device, as for example that shown in FIG. 2.

A control message exists to individually address any connected Type II device and instruct such device to automatically adjust an offset to each subsequent date and time received as necessary to apply a fixed offset in hundredths of a second for transmission insertion or processing delays specific to the equipment or device attached to the OnTime™ receiver. The minimum insertion delay for a control message is approximately 12 bits which at 267 bps is 45 ms.

The Control message format includes a clear i.e. unencrypted 'control' field for network diagnostic and maintenance purposes. One use of the encrypted control message which once authenticated is passed through to the associated appliance or device is to turn devices on and off, another use is to request a call-back or other pre-programmed response from the electrical or electronic device response even providing a call-back number or address in the variable length encrypted field or as a predefined response to a 4 bit control field.

The Type II device option necessarily limits the scope of the signal and protects its own unique device serial number.

The Universal Time Code offset from a datum reference such as GMT or hours west of the International date line is transmitted as part of the date bit stream so it is at least three times each minute.

As power distribution is usually within 100 miles of the injection point and co-located with the high voltage distribution point there is no normal circumstance where the signal will physically cross more than two time zones.

On the hour events are synchronized by the control terminal throughout the day. (See the example for the special case of midnight below.)

Approaching a local date change, or an occurrence caused by daylight savings, religious, national, or other significant occurrence the transmission control terminal can alter the frequency of transmission. Varying date up to once a second and time up to 10 times a second (based on the maximum throughput signaling rate of the Transmitter) and then slowly reverting to normal transmission rates the further the actual time is from the time of the event.

This will mean prioritization of control messages around such action and will result in a throughput at these times of less than that shown in Table 2. This regimen will be defined for each Transmitter location as it is a programmable feature of the control terminal.

Rates of change will take into account the likelihood of multiple time zones being served by the same transmitter.

For example: On New Years Eve a time reference may be being transmitted 3.5 times each second.

The transmitter may broadcast a time/date string combination ending at 23:59:59.13 and defer 23:59:59.27 to transmit ending at 23:59:59.87. Such would allow for the value added offset that may be in Type II devices. Type I licensed Manufactures are likely to round such time to 00.00. Taking into account processing delays and a human's average visual reaction processing time this isn't a bad approximation for new years eve!.

Such adjustments in, or delays for asynchronous time events do not carry for more than 0.5 s and are repeated around the hour before and the hour after the event or as necessary to account for the local time-zone if serving customers on both sides of a time-zone.

In the event of a power failure, or a disruption to the electricity supply, the high voltage transmitter co-located with the actual supply equipment will automatically transmit date and time strings at maximum rate. This will continue for at least 30 seconds following restoration. This is to insure all OnTime™ chronological devices attached to the network are synchronized. The interval between time strings and a date string will slowly increase till the normal operating interval is reached. The signal injection equipment being located normally at a higher voltage within the network may automatically suspend other encrypted control functions, modify priority of such, or undergo other modified transmission cycle. As one or more voltage transformations may occur before use this requirement recognizes that all equipment attached to the network segment affected may not have seen the disruption of service. Particularly if it was very brief and on a separate intermediate feeder circuit or the AC device had sufficient DC power stored to not see the occurrence. Due to the regular broadcast of time strings, switching to UPS or generator is likely to be detected in the OnTime™ device by a missed pulse even if the AC Generator licensed an OnTime™ Transmitter in their equipment.

Any Type II OnTime™ equipped device may also decodes authenticated control messages interleaved with the date/time strings. In the event of a power failure the processing of non essential control messages will halt (the manufacturer should specify an on recovery reset condition to be applied). This follows the OnTime™ prescribed safety features built into the controlled equipment including lockout and recovery based on possibly an incomplete message being transmitted.

Manufacturers using devices that display time usually generate there own reference time frequency or pulse, or 'clock' using 'crystals' Integrated Circuit or other direct or derived timing source. To all such manufacturers, OnTime™ represents an accurate external reference time source to keep their displayed time accurate. Their design engineers can use reset conditions or a regular polling interval, or a shared register to sample or reset the reference date and time stream being provided by OnTime™.

There are simple rules based methods for time device manufacturers to read back a register containing the updated reference date and time written directly by the serial data stream output by the OnTime™ receiver.

Equipment manufacturers will need to license the technology to be able to reference the new, external OnTime™ signal. They undertake to make other modifications as required by the licensing agreement as well as those which they see fit to do to accommodate OnTime™ in their own equipment. This might include any further display functions needed to indicate known conditions such as lack of synchronization.

Figure 8:
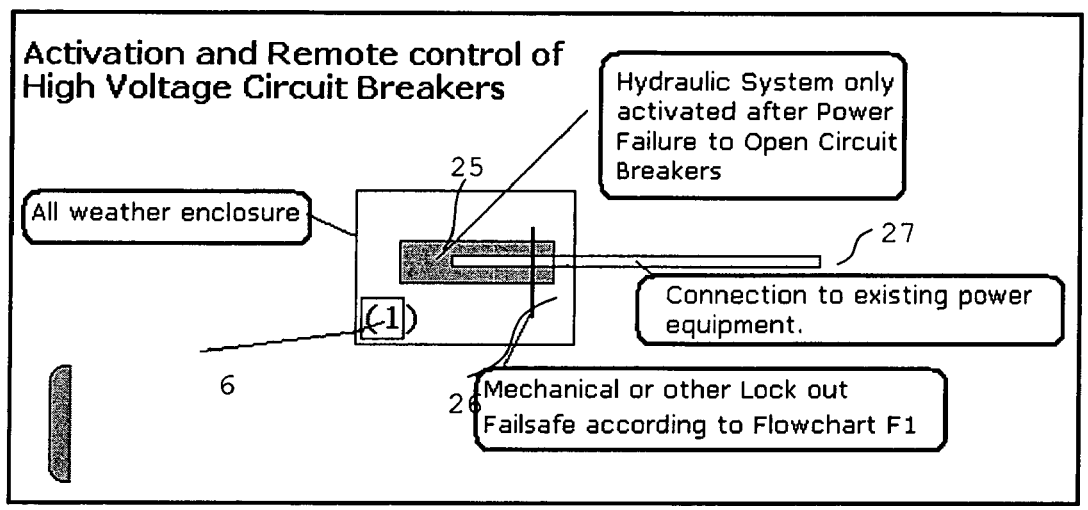
FIG. 8 shows an activation and remote control of high voltage circuit breakers as a first application example of the exemplary embodiment shown in FIG. 1.
Figure 9:
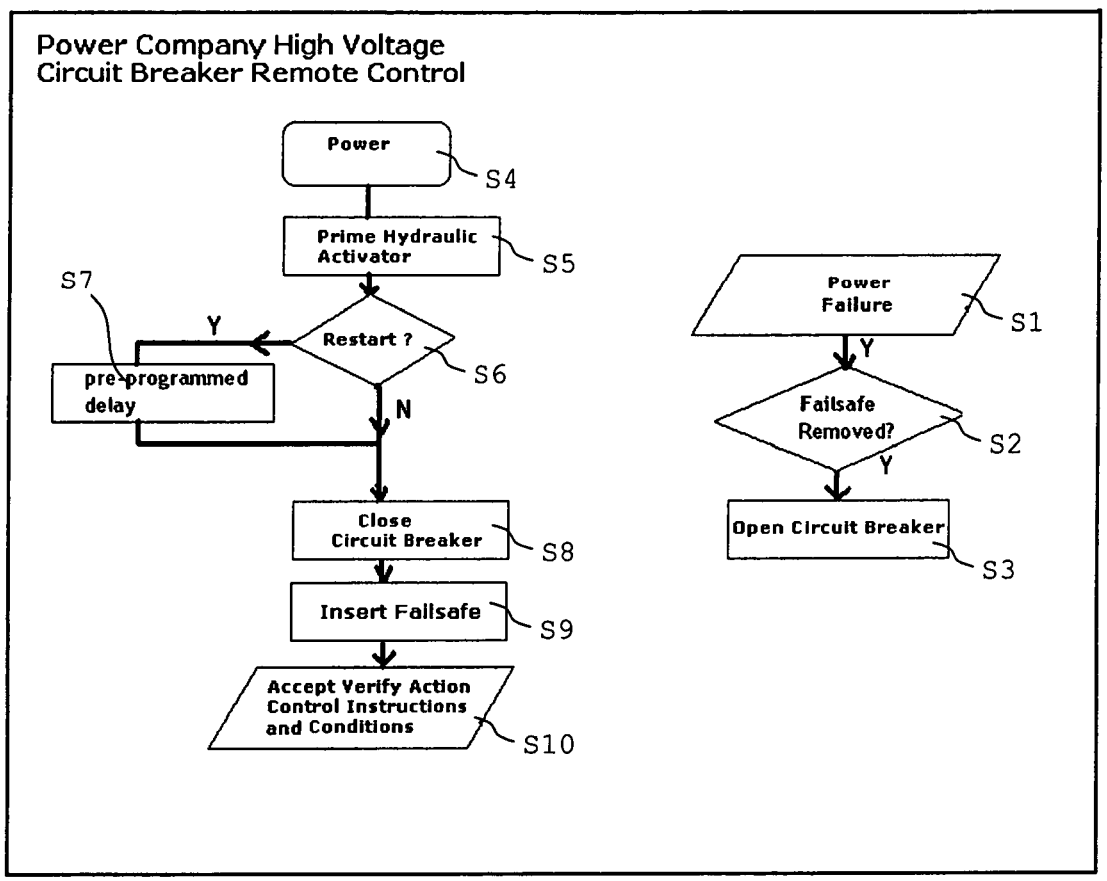
FIG. 9 shows a flow chart of a Power Company high voltage circuit breaker remote control for the first application example shown in FIG. 8.

FIG. 8 shows an activation and remote control of high voltage circuit breakers as a first application example of the present invention. The receiving device 6 according to the present invention is included within an all weather enclosure that also hosts a hydraulic system 25 that is only activated after power failure to open circuit breakers. The hydraulic system 25 has a connection 27 to existing power equipment via a mechanical or other lock out 26 to perform a failsafe as described in the following in reference to FIG. 9, which describes the Power Company high voltage circuit breaker remote control that can be performed via the receiving device 6 that controls the high voltage circuit breaker.

In a first step S1 a power failure occurs. Then, if it is determined in a second step S2 that the failsafe 26 is removed, the circuit breaker opens 25 in a third step S3.

If now the Power Company wants to close the circuit breaker, the particular receiving device 6 within the all weather enclosure of the particular circuit breaker 25 can be addressed to initiate the closing of the circuit breaker 25. Therefore, the Power Company sends power to the receiving device 6 in a fourth step S4. The receiving device decodes the included command and primes the hydraulic activator in a fifth step S5 and checks in a following sixth step S6 whether or not the closing of the circuit breaker 25 should be initiated with a delay. If the closing of the circuit breaker 25 should be initiated with a delay, a seventh step S7 is performed that effects the delay before in a following eighth step S8 the circuit breaker 25 is closed. If the closing of the circuit breaker 25 should be initiated with no delay, the eighth step S8 to close the circuit breaker 25 is directly performed. After the eighth step S8 the failsafe 26 gets inserted by instruction of the receiving device 6 in a ninth step S9. In a final tenth step S10 the receiving device will process any other instructions to it while waiting for a power failure to occur.

Figure 10:
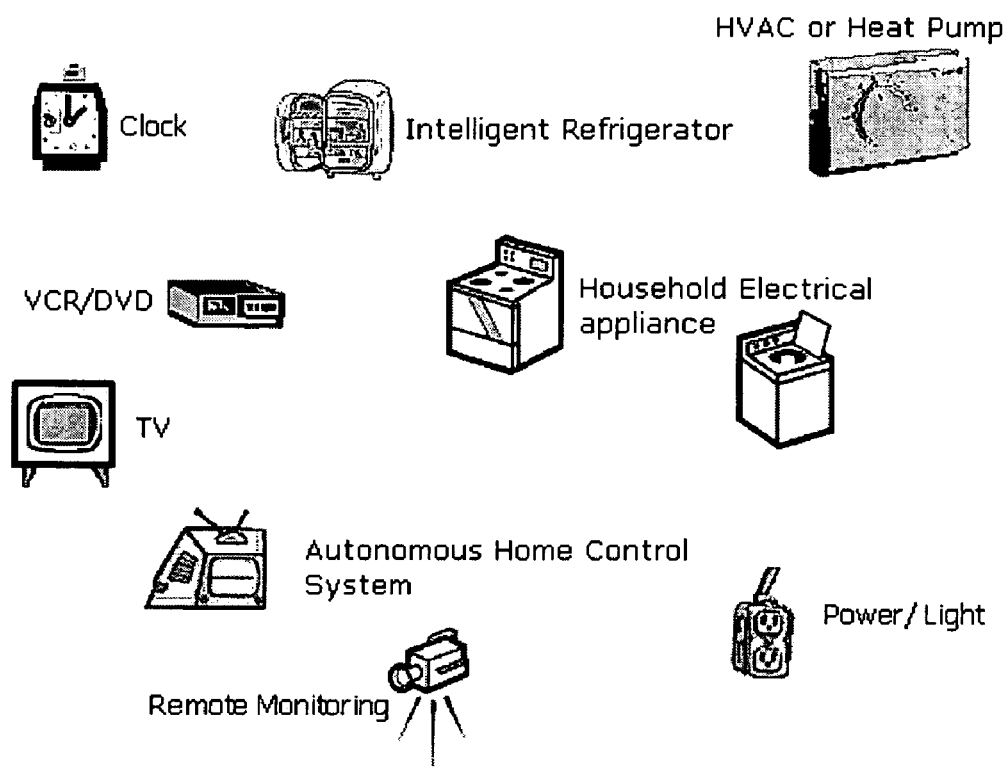
FIG. 10 shows examples for a home appliance control interface as a second application example of the exemplary embodiment shown in FIG. 1.

FIG. 10 shows examples for a home appliance control interface as a second application example of the exemplary embodiment shown in FIG. 1, namely for a HVAC or Heat Pump, for an intelligent refrigerator, a VCR/DVD player, household electrical appliances, TV, remote monitoring, power/light switching, clock setting, e.g. alarm setting, and/or an autonomous house control system. Of course, these are only examples.

Figure 11:
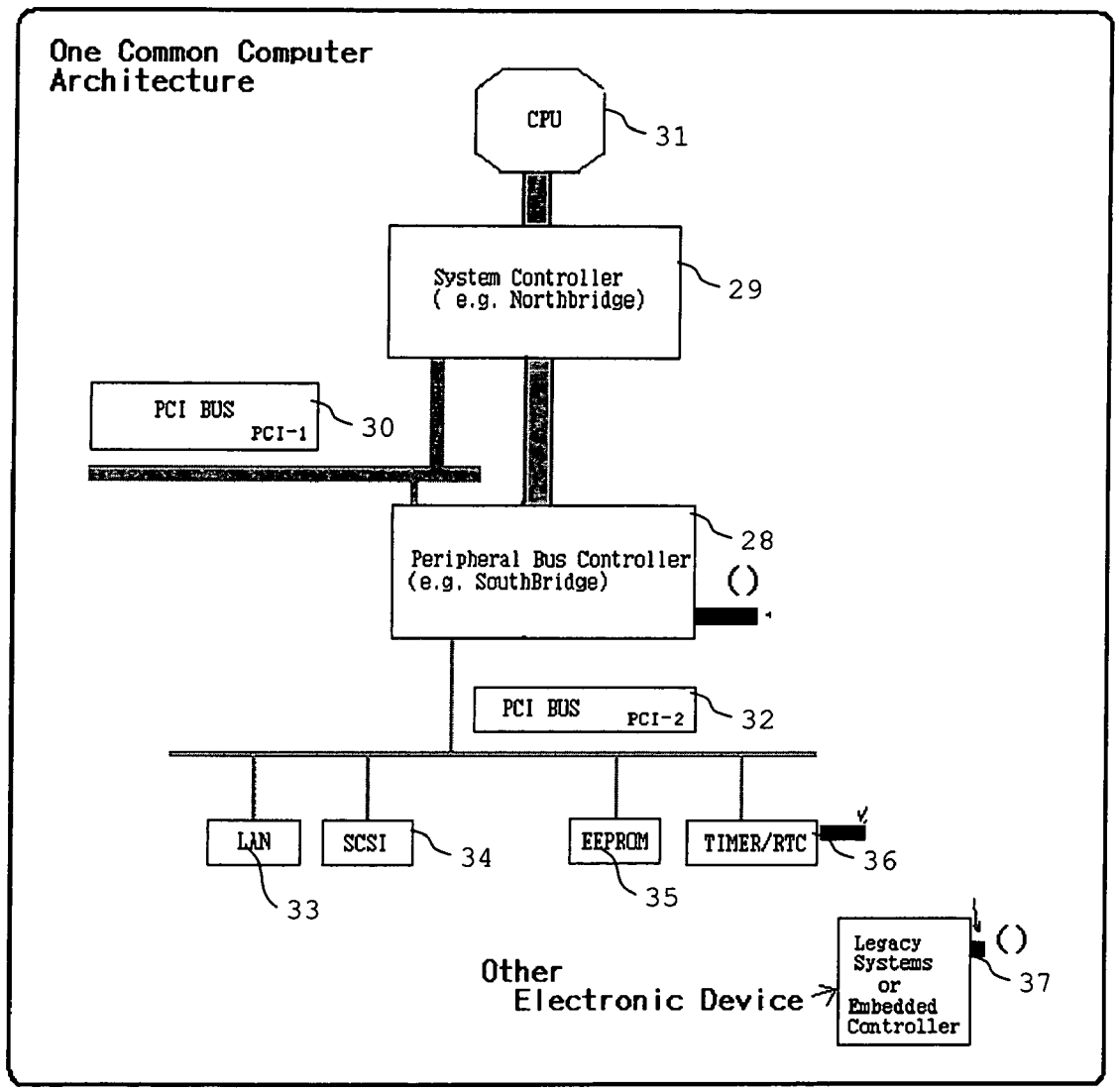
FIG. 11 shows an integration of a receiver according to the present invention into a computer and other electronic devices as a third application example of the exemplary embodiment shown in FIG. 1.

FIG. 11 shows an integration of a receiver according to the present invention into a computer and other electronic devices as a third application example of the present invention. In particular, the receiver might be integrated into a peripheral bus controller 28, e.g. Southbridge, that is connected to a system controller, e.g. Northbridge, which is in turn connected to a CPU of a computer that additionally to these components also includes a first PCI bus 30 and a second PCI bus 32, via which the computer is connected to a LAN 33, an SCSI interface 34, an EEPROM 35, and a timer/Real Time clock RTC 36. The receiver according to the present invention might alternatively or additionally be integrated into the timer/RTC 36. The receiver according to the present invention might further alternatively or additionally be integrated into an other electronic device 37, such as legacy systems or an embedded controller.

Any advantages and benefits described may not apply to all embodiments of the invention. When the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. Claims that do not use the word means are not intended to fall under 35 USC 112, paragraph 6. It is intended that the scope of the invention be limited not by this detailed description, but rather by the claims appended hereto.

What is claimed is:

1. A transmission device for transmitting digital information via a power supply network, comprising of:
   a generator for generating a simulated digital wave-form carrying the digital information to be transmitted, wherein the simulated digital wave-form is built of predetermined harmonic frequencies of a signal frequency;
   a high-voltage injector to inject the generated simulated digital wave-form carrying the digital information into the power supply network;
   wherein said high-voltage injector comprises drive stage transistors to inject the generated simulated digital wave-form carrying the digital information into the power supply network; and
   a chopping unit that coupled to the power supply network, wherein the chopping unit rapidly turns the drive stage transistors on and off in conformance with the shape of a low frequency wave-form.

2. The transmission device of claim 1, wherein a feedback control that detects specific conditions of the power supply network to vary a chopping on/off cycle of the drive stage transistors accordingly and/or to shut down and turn on the drive stage transistors accordingly.

3. The transmission device of claim 1, wherein said digital information is:
   date and/or time and/or time-zone information; or
   control information, which control information is encrypted and comprises an addressing functionality so that at least one particular receiving device connected to said power supply network can access said control information.

4. The transmission device of claim 3, wherein said digital information is used in a device or chip for processing said digital information to control a function, wherein the function is selected from a group consisting of a remote operation of a manufacturer feature, a process to enhance the device by integration of a control feature, a process to accurately synchronized date and time, a process to implement a secure remote instruction of load management and switching devices used in high voltage power distribution systems.

5. A receiving device for receiving digital information via a power supply network comprising of:
   an analogue detector for detecting predetermined harmonic frequencies of a signal frequency; and
   a logic device in communication with the analogue detector, wherein the logic device is adapted to output a logic signal corresponding to the output signal of the analogue detector as said digital information, and
   an information retrieval unit in communication with the logic device, wherein the information retrieval unit is adapted to retrieve control information directed to said particular receiving device wherein said information retrieval unit comprises a decryption unit to verify whether or not said control information is addressed to said particular receiving device and to decrypt said control information with a predetermined key.

6. The receiving device of claim 5, wherein said predetermined harmonic frequencies of the signal frequency include the first and third harmonic frequencies of the signal frequency.

7. The receiving device of claim 5, comprising of an optical interface arranged in an output path of the logic device.

8. The receiving device of claim 5, wherein said digital information is:
   date and/or time and/or time-zone information; or
   control information, which control information is preferably encrypted and comprises an addressing functionality so that at least one particular receiving device connected to said power supply network can access said control information.

9. The receiving device of claim 8, wherein said digital information is used in a device for Processing said digital information to control a function, wherein the function is selected from a group consisting of a remote activation of a manufacturer feature, a process to enhance the device by integration of a trusted control feature, a process to accurately synchronize date and time, and a process for implementing secure remote instruction of load management and switching devices used in high voltage power distribution systems.

10. The receiving device of claim 5, wherein the device for processing said information is a personal computer.

11. A method for transmitting digital information via a power supply network, comprising the steps of:
generating a simulated digital wave-form carrying the digital information to be transmitted in either a time synchronous or encrypted form, wherein the simulated digital wave-form is built of predetermined harmonic frequencies of a signal frequency; and
injecting the generated simulated digital wave-form carrying the digital information into the power supply network after having been modulated a chopping process.

12. The method of claim 11, further comprising rapidly turning drive stage transistors on and off in conformance with a shape of the low frequency wave-form.

13. The method of claim 12, further comprising detecting specific conditions of the power supply network, and varying a chopping on/off cycle of the drive stage transistors accordingly.

* * * * *